US007876316B2

(12) United States Patent
Morita

(10) Patent No.: US 7,876,316 B2
(45) Date of Patent: Jan. 25, 2011

(54) REFERENCE VOLTAGE SELECTION CIRCUIT, DISPLAY DRIVER, ELECTRO-OPTICAL DEVICE, AND ELECTRONIC INSTRUMENT

(75) Inventor: Akira Morita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 391 days.

(21) Appl. No.: 12/143,462

(22) Filed: Jun. 20, 2008

(65) Prior Publication Data

US 2008/0316194 A1 Dec. 25, 2008

(30) Foreign Application Priority Data

Jun. 22, 2007 (JP) ............................ 2007-164937

(51) Int. Cl.
*G06F 3/038* (2006.01)
*G09G 5/00* (2006.01)

(52) U.S. Cl. ........................................ 345/211; 345/87

(58) Field of Classification Search .................. 345/87, 345/204, 211–213
See application file for complete search history.

(56) References Cited

U.S. PATENT DOCUMENTS

| | | | | |
|---|---|---|---|---|
| 6,950,045 | B2 * | 9/2005 | Kim | 341/118 |
| 7,106,321 | B2 * | 9/2006 | Morita | 345/211 |
| 7,126,518 | B2 * | 10/2006 | Tsuchi | 341/144 |
| 2003/0151577 | A1 | 8/2003 | Morita | |
| 2003/0151578 | A1 | 8/2003 | Morita | |
| 2003/0151616 | A1 * | 8/2003 | Morita | 345/690 |
| 2003/0151617 | A1 | 8/2003 | Morita | |
| 2005/0128113 | A1 * | 6/2005 | Kyung-Myun | 341/138 |
| 2006/0197734 | A1 | 9/2006 | Morita | |

FOREIGN PATENT DOCUMENTS

| | | |
|---|---|---|
| JP | A-2001-127615 | 5/2001 |
| JP | A 2003-233354 | 8/2003 |
| JP | A 2003-233355 | 8/2003 |
| JP | A 2003-233357 | 8/2003 |
| JP | A-2004-029230 | 1/2004 |
| JP | A-2004-266588 | 9/2004 |
| JP | A 2006-227271 | 8/2006 |
| JP | A-2006-243231 | 9/2006 |

* cited by examiner

*Primary Examiner*—Ricardo L Osorio
(74) *Attorney, Agent, or Firm*—Oliff & Berridge, PLC

(57) ABSTRACT

A reference voltage selection circuit includes a first switch element SW1 that outputs a first selection voltage among first to third selection voltages as a first reference voltage among first and second reference voltages, a second switch element SW2 that outputs the second selection voltage as the first reference voltage, a third switch element SW3 that outputs the second selection voltage as the second reference voltage, and a fourth switch element SW4 that outputs the third selection voltage as the second reference voltage. The first to fourth switch elements SW1 to SW4 are ON/OFF-controlled using gamma correction data that contains at least three bits. When the first selection voltage is a ground power supply voltage, reliability can be improved by protecting the first switch element.

15 Claims, 23 Drawing Sheets

FIG. 8

| SELECTION VOLTAGE | GAMMA CORRECTION DATA | REFERENCE VOLTAGE |
| --- | --- | --- |
| $V_G255$ | REG255=1 | V63 |
| $V_G254$ | REG254=0 | — |
| $V_G253$ | REG253=0 | — |
| $V_G252$ | REG252=1 | V62 |
| ⋮ | ⋮ | ⋮ |
| $V_G3$ | REG3=0 | — |
| $V_G2$ | REG2=1 | V1 |
| $V_G1$ | REG1=1 | V0 |
| $V_G0$ | REG0=0 | — |

FIG. 13

| REG2 | REG1 | REG0 | V1 | V0 |
|---|---|---|---|---|
| 1 | 1 | 0 | $V_G2$ | $V_G1$ |
| 1 | 0 | 1 | $V_G2$ | $V_G0$ |
| 0 | 1 | 1 | $V_G1$ | $V_G0$ |

REFERENCE VOLTAGE SELECTION CIRCUIT, DISPLAY DRIVER, ELECTRO-OPTICAL DEVICE, AND ELECTRONIC INSTRUMENT

Japanese Patent Application No. 2007-164937 filed on Jun. 22, 2007, is hereby incorporated by reference in its entirety.

BACKGROUND OF THE INVENTION

The present invention relates to a reference voltage selection circuit, a display driver, an electro-optical device, an electronic instrument, and the like.

An electro-optical device represented by a liquid crystal display (LCD) panel has been widely provided in portable electronic instruments. An image display rich in color tone due to an increase in the number of grayscale levels is desired for an electro-optical device.

An image signal for displaying an image is generally gamma-corrected corresponding to the display characteristics of a display device. Taking an electro-optical device as an example, a reference voltage corresponding to grayscale data that determines the grayscale value is selected from a plurality of reference voltages, and the transmissivity of a pixel is changed based on the selected reference voltage. Therefore, gamma correction is implemented by changing the voltage level of each reference voltage.

The reference voltage is generated by dividing the voltage across a ladder resistor circuit using a plurality of resistor elements of the ladder resistor circuit. Therefore, the voltage level of each reference voltage can be changed by changing the resistance of each resistor element.

A more accurate gamma correction is desired in order to deal with an increase in resolution and diversification of LCD panels. JP-A-2006-227271 discloses a reference voltage selection circuit that implements gamma correction by a simple configuration, for example.

The reference voltage selection circuit disclosed in JP-A-2006-227271 suppresses an increase in circuit scale by forming switch elements for selectively outputting the reference voltage in a matrix. Moreover, an increase in circuit scale of the reference voltage selection circuit can be suppressed even if the number of reference voltages and the like increases.

As a result of studies on the reference voltage selection circuit and the technological idea disclosed in JP-A-2006-227271, it was found that reliability can be further improved by taking appropriate measures.

SUMMARY

According to one aspect of the invention, there is provided a reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the ground power supply voltage being supplied as the first selection voltage; and a current density of a channel region of a transistor that forms the first switch element being lower than a current density of a channel region of a transistor that forms a switch element among the second switch element, the third switch element, and the fourth switch element.

According to another aspect of the invention, there is provided a reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the ground power supply voltage being supplied as the first selection voltage; and the reference voltage selection circuit further including a bypass circuit that bypasses the first switch element when a potential of the first selection voltage is lower than a ground potential.

According to another aspect of the invention, there is provided a reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the ground power supply voltage being supplied as the first selection voltage; and the first switch element including an n-type pass transistor.

According to another aspect of the invention, there is provided a reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the high-potential-side power supply voltage being supplied as the third selection voltage; and a current density of a channel region of a transistor that forms the fourth switch element being lower than a current density of a channel region of a transistor that forms a switch element among the first switch element, the second switch element, and the third switch element.

According to another aspect of the invention, there is provided a reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the high-potential-side power supply voltage being supplied as the third selection voltage; and the reference voltage selection circuit further including a bypass circuit that bypasses the fourth switch element when a potential of the third selection voltage is higher than a high-potential-side power supply potential.

According to another aspect of the invention, there is provided a reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the high-potential-side power supply voltage being supplied as the third selection voltage; and the fourth switch element including a p-type pass transistor.

According to another aspect of the invention, there is provided a display driver that drives a plurality of data lines of an electro-optical device, the display driver comprising:

one of the above reference voltage selection circuits;

a voltage selection circuit that selects a reference voltage corresponding to grayscale data from a plurality of reference voltages from the reference voltage selection circuit, and outputs the selected reference voltage as a data voltage; and a driver circuit that drives the plurality of data lines based on the data voltage.

According to another aspect of the invention, there is provided an electro-optical device comprising:

a plurality of scan lines;

a plurality of data lines;

a plurality of pixel electrodes, each of the plurality of pixel electrodes being specified by a scan line among the plurality of scan lines and a data line among the plurality of data lines;

a scan driver that scans the plurality of scan lines; and the above display driver that drives the plurality of data lines According to another aspect of the invention, there is provided an electronic instrument comprising the above display driver.

BRIEF DESCRIPTION OF THE SEVERAL VIEWS OF THE DRAWING

FIG. 8 is view illustrative of an operation example of a reference voltage selection circuit shown in FIG. 6.

FIG. 13 is a view showing an operation example of the reference voltage selection circuit shown in FIG. 11.

DETAILED DESCRIPTION OF THE EMBODIMENT

Figure 1:
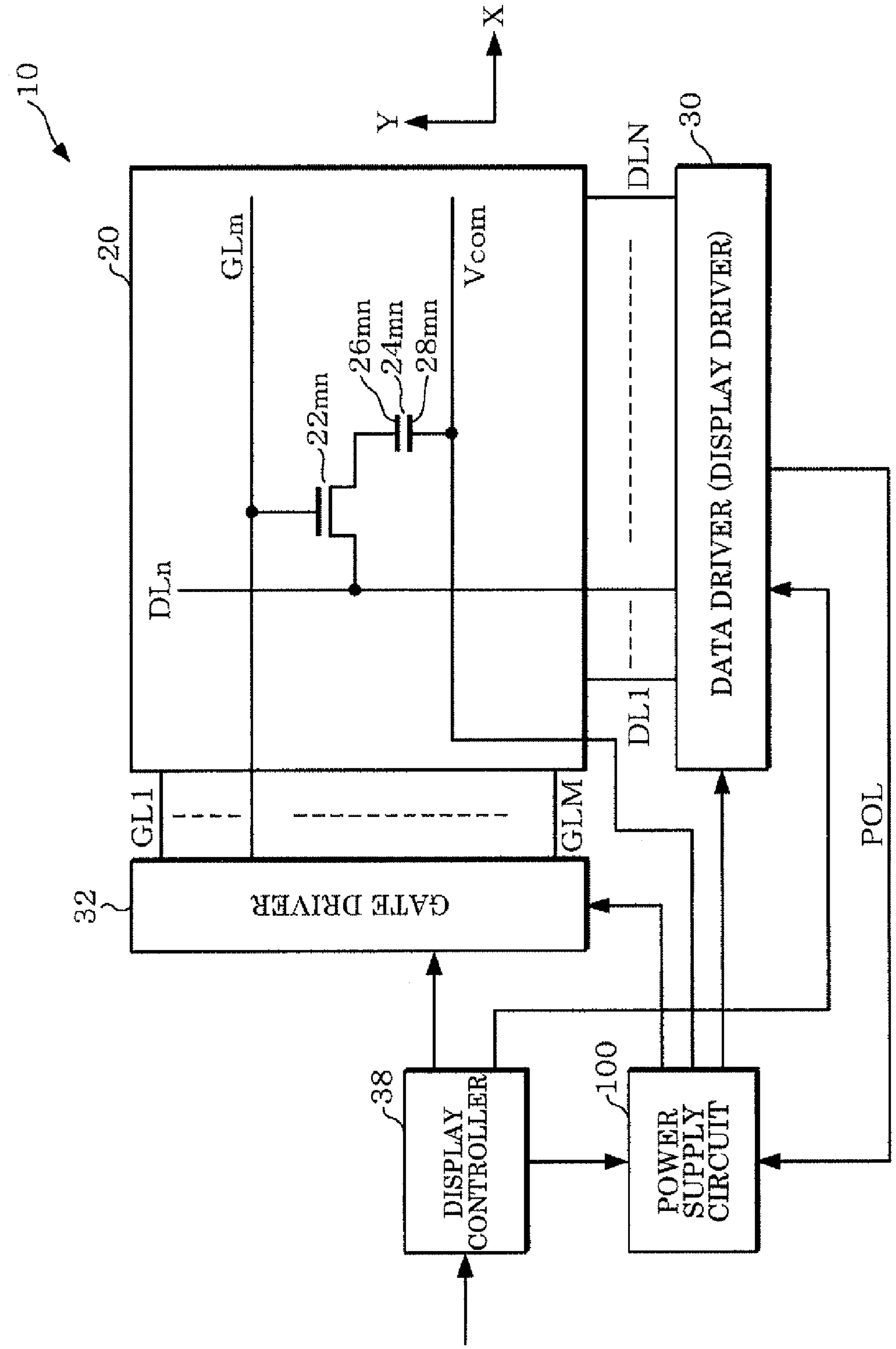
FIG. 1 is a view showing an outline of the configuration of a liquid crystal display device according to one embodiment of the invention.

Several aspects of the invention may provide a reference voltage selection circuit, a display driver, an electro-optical device, and an electronic instrument that implement highly accurate gamma correction by a simple configuration.

Further aspects of the invention may provide a reference voltage selection circuit, a display driver, an electro-optical device, and an electronic instrument that implement highly accurate gamma correction by a simple configuration while further improving reliability.

According to one embodiment of the invention, there is provided a reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the ground power supply voltage being supplied as the first selection voltage; and a current density of a channel region of a transistor that forms the first switch element being lower than a current density of a channel region of a transistor that forms a switch element among the second switch element, the third switch element, and the fourth switch element.

In the reference voltage selection circuit, when a channel width of a transistor is referred to as W and a channel length of the transistor is referred to as L, a ratio W/L of the transistor that forms the first switch element may be larger than a ratio W/L of the transistor that forms the switch element among the second switch element, the third switch element, and the fourth switch element.

According to this embodiment, the reference voltage selection circuit includes at least the first to fourth switch elements, and makes it unnecessary to provide a switch element that outputs the first selection voltage as the second reference voltage. Moreover, when outputting only the first and second reference voltages, a switch element that outputs the third selection voltage as the first reference voltage can be omitted. Therefore, a reference voltage selection circuit that can select the reference voltage for implementing highly accurate gamma correction by a simple configuration can be provided.

Since the current density of the channel region of the transistor that forms the first switch element is reduced when the ground power supply voltage is supplied as the first selection voltage, a possibility that the first switch element is destroyed can be significantly reduced even if the potential of the power supply line to which the first selection voltage is supplied has become lower than the ground potential, whereby reliability can be further improved.

According to another embodiment of the invention, there is provided a reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the ground power supply voltage being supplied as the first selection voltage; and the reference voltage selection circuit further including a bypass circuit that bypasses the first switch element when a potential of the first selection voltage is lower than a ground potential.

In the reference voltage selection circuit, the bypass circuit may include:

an n-type MOS transistor, the ground power supply voltage being supplied to a gate of the n-type MOS transistor; and a p-type MOS transistor, a source and a drain of the p-type MOS transistor being respectively connected to a source and a drain of the n-type MOS transistor and the high-potential-side power supply voltage being supplied to a gate of the p-type MOS transistor; and the bypass circuit may be provided in parallel with the first switch element.

According to this embodiment, the reference voltage selection circuit includes at least the first to fourth switch elements, and makes it unnecessary to provide a switch element that outputs the first selection voltage as the second reference voltage. Moreover, when outputting only the first and second reference voltages, a switch element that outputs the third selection voltage as the first reference voltage can be omitted. Therefore, a reference voltage selection circuit that can select the reference voltage for implementing highly accurate gamma correction by a simple configuration can be provided.

Since the bypass circuit is provided in parallel with the first switch element when the ground power supply voltage is supplied as the first selection voltage, a current that flows through the first switch element can be bypassed using the bypass circuit when the potential of the power supply line to which the first selection voltage is supplied has become lower than the ground potential. This significantly reduces a possibility that the first switch element is destroyed, whereby reliability can be further improved.

According to another embodiment of the invention, there is provided a reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the ground power supply voltage being supplied as the first selection voltage; and the first switch element including an n-type pass transistor.

According to this embodiment, the reference voltage selection circuit includes at least the first to fourth switch elements, and makes it unnecessary to provide a switch element that outputs the first selection voltage as the second reference voltage. Moreover, when outputting only the first and second reference voltages, a switch element that outputs the third selection voltage as the first reference voltage can be omitted. Therefore, a reference voltage selection circuit that can select the reference voltage for implementing highly accurate gamma correction by a simple configuration can be provided.

Since the first switch element is formed using the n-type pass transistor when the ground power supply voltage is supplied as the first selection voltage, the current density of the channel region of the transistor that forms the first switch element can be reduced even if the potential of the power supply line to which the first selection voltage is supplied has become lower than the ground potential. This significantly reduces a possibility that the first switch element is destroyed, whereby reliability can be further improved. Moreover, since the size of the transistor can be increased by forming the first switch element using the pass transistor, the current density of the channel region can be reduced without increasing the area of the reference voltage selection circuit.

According to another embodiment of the invention, there is provided a reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the high-potential-side power supply voltage being supplied as the third selection voltage; and a current density of a channel region of a transistor that forms the fourth switch element being lower than a current density of a channel region of a transistor that forms a switch element among the first switch element, the second switch element, and the third switch element.

In the reference voltage selection circuit, when a channel width of a transistor is referred to as W and a channel length of the transistor is referred to as L, a ratio W/L of the transistor that forms the fourth switch element may be larger than a ratio W/L of the transistor that forms the switch element among the first switch element, the second switch element, and the third switch element.

According to this embodiment, the reference voltage selection circuit includes at least the first to fourth switch elements, and makes it unnecessary to provide a switch element that outputs the first selection voltage as the second reference voltage. Moreover, when outputting only the first and second reference voltages, a switch element that outputs the third selection voltage as the first reference voltage can be omitted. Therefore, a reference voltage selection circuit that can select the reference voltage for implementing highly accurate gamma correction by a simple configuration can be provided.

Since the current density of the channel region of the transistor that forms the fourth switch element is reduced when the high-potential-side power supply voltage is supplied as the fourth selection voltage, a possibility that the first switch element is destroyed can be significantly reduced even if the potential of the power supply line to which the fourth selection voltage is supplied has become higher than the potential of the high-potential-side power supply voltage, whereby reliability can be further improved.

According to another embodiment of the invention, there is provided a reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the high-potential-side power supply voltage being supplied as the third selection voltage; and the reference voltage selection circuit further including a bypass circuit that bypasses the fourth switch element when a potential of the third selection voltage is higher than a high-potential-side power supply potential.

In the reference voltage selection circuit, the bypass circuit may include:

a p-type MOS transistor, the high-potential-side power supply voltage being supplied to a gate of the p-type MOS transistor; and an n-type MOS transistor, a source and a drain of the p-type MOS transistor being respectively connected to a source and a drain of the n-type MOS transistor and the ground power supply voltage being supplied to a gate of the p-type MOS transistor; and the bypass circuit may be provided in parallel with the fourth switch element.

According to this embodiment, the reference voltage selection circuit includes at least the first to fourth switch elements, and makes it unnecessary to provide a switch element that outputs the first selection voltage as the second reference voltage. Moreover, when outputting only the first and second reference voltages, a switch element that outputs the third selection voltage as the first reference voltage can be omitted. Therefore, a reference voltage selection circuit that can select the reference voltage for implementing highly accurate gamma correction by a simple configuration can be provided.

Since the bypass circuit is provided in parallel with the fourth switch element when the high-potential-side power supply voltage is supplied as the fourth selection voltage, a current that flows through the fourth switch element can be bypassed using the bypass circuit when the potential of the power supply line to which the fourth selection voltage is supplied has become higher than the potential of the high-potential-side power supply voltage. This significantly reduces a possibility that the fourth switch element is destroyed, whereby reliability can be further improved.

According to another embodiment of the invention, there is provided a reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the high-potential-side power supply voltage being supplied as the third selection voltage; and the fourth switch element including a p-type pass transistor.

According to this embodiment, the reference voltage selection circuit includes at least the first to fourth switch elements, and makes it unnecessary to provide a switch element that outputs the first selection voltage as the second reference voltage. Moreover, when outputting only the first and second reference voltages, a switch element that outputs the third selection voltage as the first reference voltage can be omitted. Therefore, a reference voltage selection circuit that can select the reference voltage for implementing highly accurate gamma correction by a simple configuration can be provided.

Since the fourth switch element is formed using the p-type pass transistor when the high-potential-side power supply voltage is supplied as the fourth selection voltage, the current density of the channel region of the transistor that forms the fourth switch element can be reduced even if the potential of the power supply line to which the fourth selection voltage is supplied has become higher than the potential of the high-potential-side power supply voltage. This significantly reduces a possibility that the fourth switch element is destroyed, whereby reliability can be further improved. Moreover, since the size of the transistor can be increased by forming the fourth switch element using the pass transistor, the current density of the channel region can be reduced without increasing the area of the reference voltage selection circuit.

In the reference voltage selection circuit, the reference voltage selection circuit may further include a first switch cell, a second switch cell, a third switch cell, and a fourth switch cell, each of the first switch cell, the second switch cell, the third switch cell, and the fourth switch cell including a switch element among the first switch element, the second switch element, the third switch element, and the fourth switch element, when the first switch cell has been enabled based on the data of the first bit of the gamma correction data, the first switch cell may activate a disable signal supplied to the second switch cell and may activate an enable signal supplied to the third switch cell, and when the first switch cell has been disabled based on the data of the first bit of the gamma correction data, the first switch cell may deactivate the disable signal supplied to the second switch cell and may deactivate the enable signal supplied to the third switch cell;

the second switch cell may output the second selection voltage as the first reference voltage and may activate an enable signal supplied to the fourth switch cell on condition that the second switch cell has been enabled based on the data of the second bit of the gamma correction data and the disable signal supplied from the first switch cell is inactive, otherwise the second switch cell may deactivate the enable signal supplied to the fourth switch cell;

the third switch cell may output the second selection voltage as the second reference voltage and may activate the disable signal supplied to the fourth switch cell on condition that the third switch cell has been enabled based on the data of the second bit of the gamma correction data and the enable signal supplied from the first switch cell is active, otherwise the third switch cell may deactivate the disable signal supplied to the fourth switch cell; and the fourth switch cell may output the third selection voltage as the second reference voltage on condition that the fourth switch cell has been enabled based on the data of the third bit of the gamma correction data, the disable signal supplied from the third switch cell is inactive, and the enable signal supplied from the second switch cell is active.

According to another embodiment of the invention, there is provided a display driver that drives a plurality of data lines of an electro-optical device, the display driver comprising:

one of the above reference voltage selection circuits;

a voltage selection circuit that selects a reference voltage corresponding to grayscale data from a plurality of reference voltages from the reference voltage selection circuit, and outputs the selected reference voltage as a data voltage; and a driver circuit that drives the plurality of data lines based on the data voltage.

According to this embodiment, a display driver that implements highly accurate gamma correction by a simple configuration while further improving reliability can be provided.

According to another embodiment of the invention, there is provided an electro-optical device comprising:

a plurality of scan lines;

a plurality of data lines;

a plurality of pixel electrodes, each of the plurality of pixel electrodes being specified by a scan line among the plurality of scan lines and a data line among the plurality of data lines;

a scan driver that scans the plurality of scan lines; and the above display driver that drives the plurality of data lines.

According to this embodiment, an electro-optical device including a display driver that implements highly accurate gamma correction by a simple configuration while further improving reliability can be provided.

According to another embodiment of the invention, there is provided an electronic instrument comprising the above display driver.

According to another embodiment of the invention, there is provided an electronic instrument comprising the above electrooptical device.

According to this embodiment, an electronic instrument that implements highly accurate gamma correction by a simple configuration while further improving reliability can be provided.

Embodiments of the invention are described in detail below with reference to the drawings. Note that the embodiments described below do not in any way limit the scope of the invention laid out in the claims. Note that all elements of the embodiments described below should not necessarily be taken as essential requirements for the invention.

1. Liquid Crystal Display Device

FIG. 1 shows an outline of the configuration of an active matrix type liquid crystal display device according to one embodiment of the invention. Note that a data driver (display driver) including a reference voltage selection circuit according to one embodiment of the invention may also be applied to a simple matrix type liquid crystal display device instead of an active matrix type liquid crystal display device.

A liquid crystal display device 10 includes an LCD panel (display panel in a broad sense; electro-optical device in a broader sense) 20. The LCD panel 20 is formed on a glass substrate, for example. A plurality of scan lines (gate lines) GL1 to GLM (M is an integer equal to or larger than two), arranged in a direction Y and extending in a direction X, and a plurality of data lines (source lines) DL1 to DLN (N is an integer equal to or larger than two), arranged in the direction X and extending in the direction Y, are disposed on the glass substrate. A pixel area (pixel) is provided corresponding to the intersection of the scan line GLm (1≦m≦M, m is an integer; hereinafter the same) and the data line DLn (1≦n≦N, n is an integer; hereinafter the same). A thin film transistor (hereinafter abbreviated as "TFT") 22mn is disposed in the pixel area.

The gate of the TFT 22mn is connected to the scan line GLm. The source of the TFT 22mn is connected to the data line DLn. The drain of the TFT 22mn is connected to a pixel electrode 26mn. A liquid crystal is sealed between the pixel electrode 26mn and a common electrode 28mn opposite to the pixel electrode 26mn so that a liquid crystal capacitor (liquid crystal element in a broad sense) 24mn is formed. The transmissivity of a pixel changes corresponding to the voltage applied between the pixel electrode 26mn and the common electrode 28mn. A common electrode voltage Vcom is supplied to the common electrode 28mn.

The LCD panel 20 is formed by bonding a first substrate provided with the pixel electrode and the TFT to a second substrate provided with the common electrode, and sealing a liquid crystal (electro-optical material) between the first and second substrates, for example.

The liquid crystal display device 10 includes a data driver (display driver in a broad sense) 30. The data driver 30 drives the data lines DL1 to DLN of the LCD panel 20 based on grayscale data.

The liquid crystal display device 10 may include a gate driver (scan driver in a broad sense) 32. The gate driver 32 scans the scan lines GL1 to GLM of the LCD panel 20 within one vertical scan period.

The liquid crystal display device 10 may include a power supply circuit 100. The power supply circuit 100 generates voltages necessary for driving the data lines, and supplies the generated voltages to the data driver 30. The power supply circuit 100 generates power supply voltages VDDH and VSSH necessary for the data driver 30 to drive the data lines and voltages for a logic section of the data driver 30, for example.

The power supply circuit 100 also generates a voltage necessary for scanning the scan lines, and supplies the generated voltage to the gate driver 32.

The power supply circuit 100 also generates the common electrode voltage Vcom. The power supply circuit 100 outputs the common electrode voltage Vcom to the common electrode of the LCD panel 20, the common electrode voltage Vcom periodically changing between a high-potential-side voltage VCOMH and a low-potential-side voltage VCOML in synchronization with the timing of a polarity reversal signal POL generated by the data driver 30.

The liquid crystal display device 10 may include a display controller 38. The display controller 38 controls the data driver 30, the gate driver 32, and the power supply circuit 100 based on information set by a host such as a central processing unit (hereinafter abbreviated as "CPU") (not shown). For example, the display controller 38 sets an operation mode of the data driver 30 and the gate driver 32, and supplies a vertical synchronization signal and a horizontal synchronization signal generated therein to the data driver 30 and the gate driver 32. In this embodiment, the display controller 38 supplies gamma correction data to the data driver 30 to implement various types of gamma correction.

In FIG. 1, the liquid crystal display device 10 includes the power supply circuit 100 and the display controller 38. Note that at least one of the power supply circuit 100 and the display controller 38 may be provided outside the liquid crystal display device 10. The liquid crystal display device 10 may include the host.

The data driver 30 may include at least one of the gate driver 32 and the power supply circuit 100.

Figure 2:
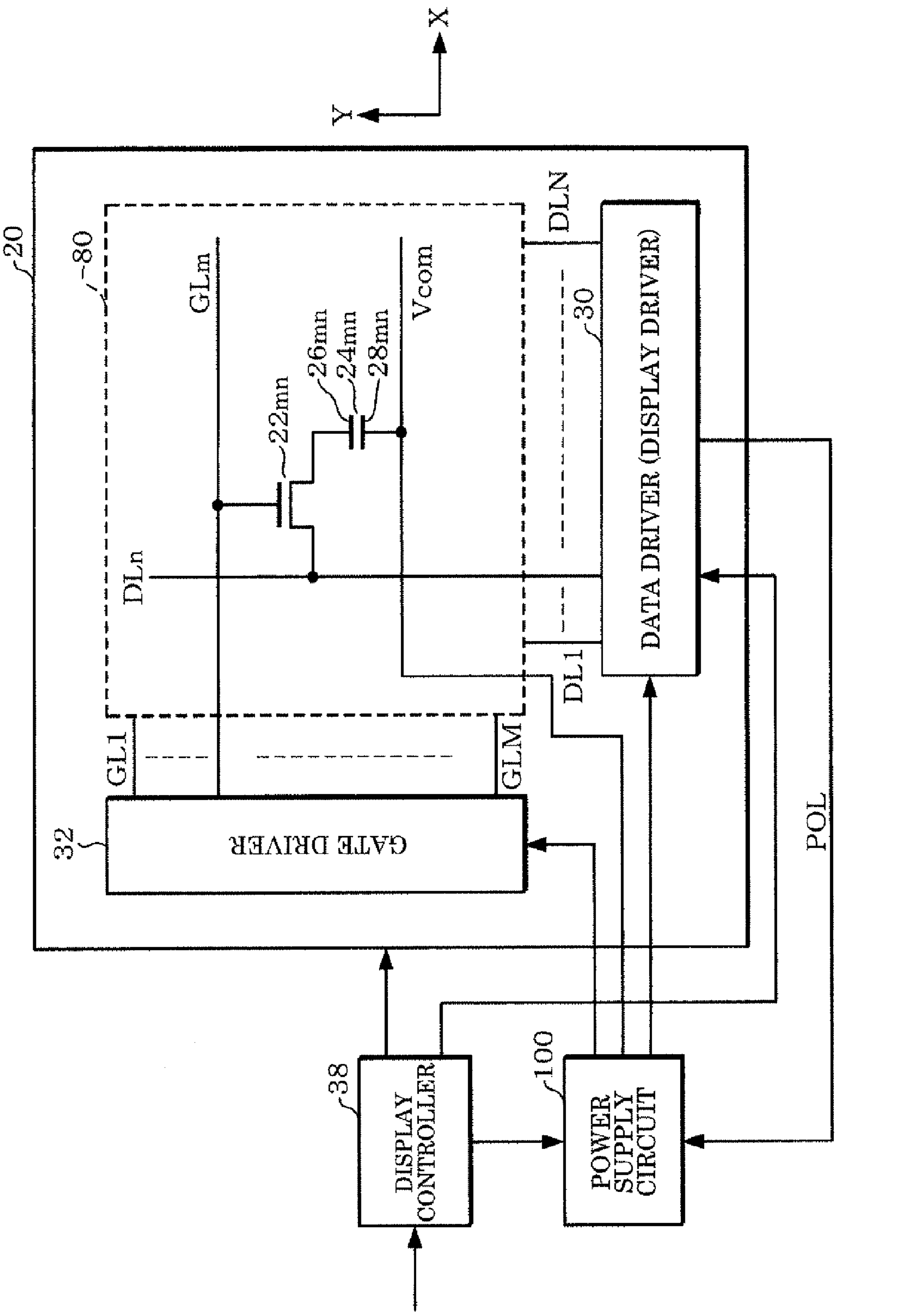
FIG. 2 is a view showing an outline of another configuration of a liquid crystal display device according to one embodiment of the invention.

Some or all of the data driver 30, the gate driver 32, the display controller 38, and the power supply circuit 100 may be formed on the LCD panel 20. In FIG. 2, the data driver 30 and the gate driver 32 are formed on the LCD panel 20. Specifically, the LCD panel 20 may include a plurality of data lines, a plurality of scan lines, a plurality of switch elements, each of which is connected to a scan line among the plurality of scan lines and a data line among the plurality of data lines, and a display driver that drives the plurality of data lines. A plurality of pixels are formed in a pixel formation area 80 of the LCD panel 20.

2. Gate Driver

Figure 3:
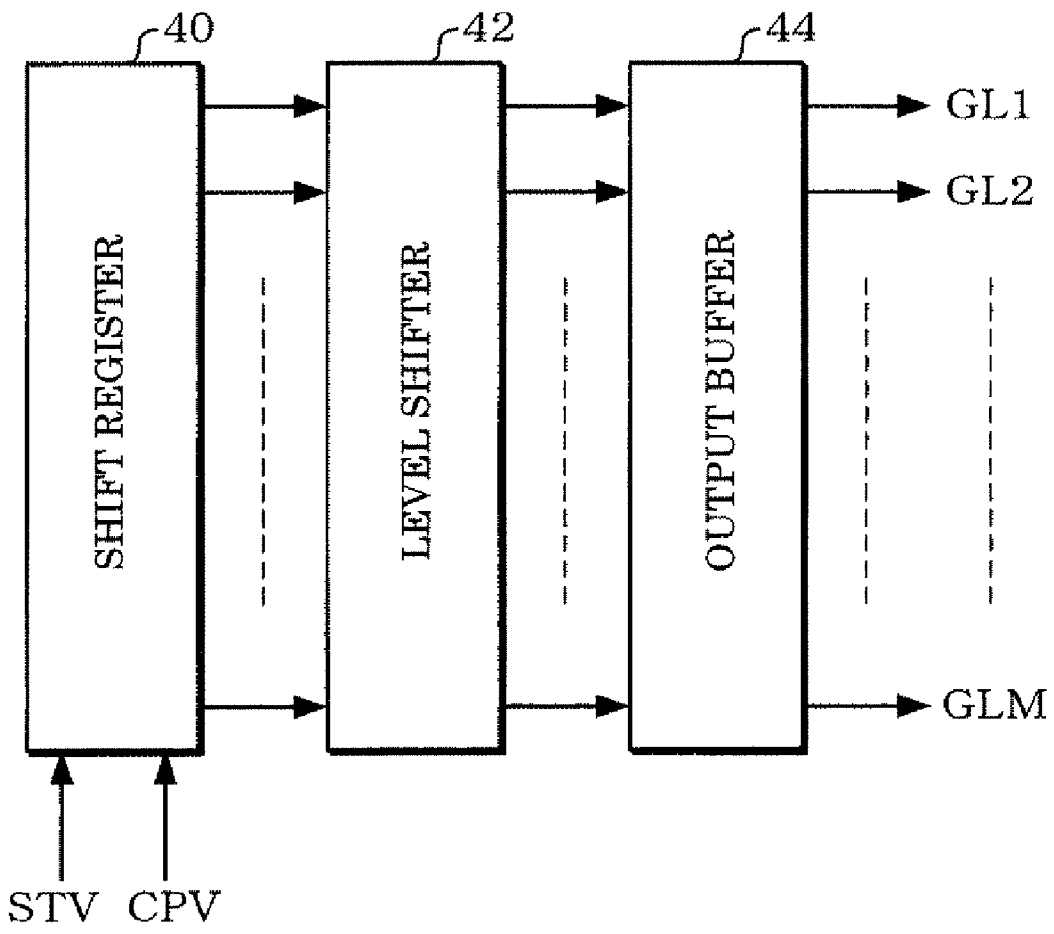
FIG. 3 is a view showing a configuration example of a gate driver shown in FIG. 1.

FIG. 3 shows a configuration example of the gate driver 32 shown in FIG. 1.

The gate driver 32 includes a shift register 40, a level shifter 42, and an output buffer 44.

The shift register 40 includes a plurality of flip-flops provided corresponding to the scan lines and sequentially connected. The shift register 40 holds a start pulse signal STV in the flip-flop in synchronization with a clock signal CPV, and sequentially shifts the start pulse signal STV to the adjacent flip-flops in synchronization with the clock signal CPV. The clock signal CPV is a horizontal synchronization signal, and the start pulse signal STV is a vertical synchronization signal.

The level shifter 42 shifts the level of the voltage input from the shift register 40 to a voltage level corresponding to the liquid crystal element of the LCD panel 20 and the transistor performance of the TFT. A voltage level as high as 20 to 50 V is required as this voltage level, for example.

The output buffer 44 buffers a scan voltage shifted by the level shifter 42, and outputs the scan voltage to the scan line to drive the scan line.

3. Data Driver

Figure 4:
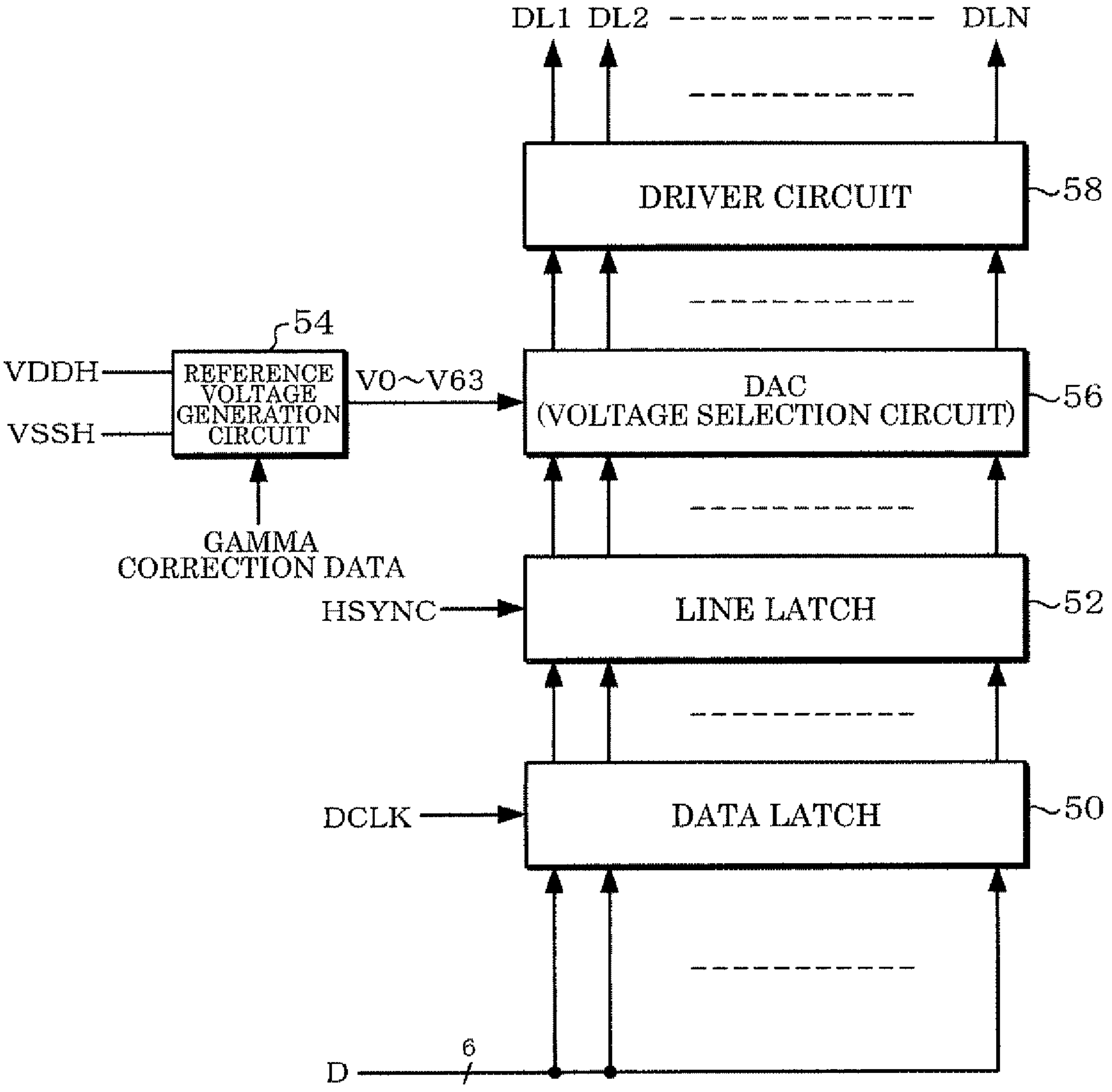
FIG. 4 is a block diagram showing a configuration example of a data driver shown in FIG. 1.

FIG. 4 is a block diagram showing a configuration example of the data driver 30 shown in FIG. 1. In FIG. 4, the number of bits of grayscale data per dot is six. Note that the invention is not limited to this number of bits of grayscale data.

The data driver 30 includes a data latch 50, a line latch 52, a reference voltage generation circuit 54, a digital/analog converter (DAC) (voltage selection circuit in a broad sense) 56, and a driver circuit 58.

The grayscale data is serially input to the data driver 30 in pixel units (or dot units). The grayscale data is input in synchronization with a dot clock signal DCLK. The dot clock signal DCLK is supplied from the display controller 38. FIG. 4 shows an example in which the grayscale data is input in dot units for convenience.

The data latch 50 shifts a capture start signal in synchronization with the dot clock signal DCLK, and latches the grayscale data in synchronization with the shift output to acquire the grayscale data corresponding to one horizontal scan, for example.

The line latch 52 latches the grayscale data corresponding to one horizontal scan latched by the data latch 50 at the change timing of a horizontal synchronization signal HSYNC.

The reference voltage generation circuit 54 generates a plurality of reference voltages respectively corresponding to the grayscale data. Specifically, the reference voltage generation circuit 54 generates first to Kth (K is an integer equal to or larger than two) reference voltages in potential descending order or potential ascending order. In this case, the reference voltage generation circuit 54 generates first to Lth (L is an integer larger than K) selection voltages arranged in potential descending order or potential ascending order, and outputs K selection voltages selected from the first to Lth selection voltages based on L-bit gamma correction data as the first to Kth reference voltages in potential descending order or potential ascending order. The data that indicates each bit of the gamma correction data corresponds to each selection voltage, and indicates whether or not to output the corresponding selection voltage as the reference voltage.

The following description is given on the assumption that L is 256 and K is 64. Specifically, the reference voltage generation circuit 54 generates reference voltages V0 to V63 based on the high-potential-side power supply voltage VDDH and the low-potential-side power supply voltage VSSH, each of the reference voltages corresponding to 6-bit grayscale data. The reference voltage generation circuit 54 generates selection voltages $V_G$0 to $V_G$255 by dividing the voltage between the high-potential-side power supply voltage VDDH and the low-potential-side power supply voltage VSSH, and outputs sixty-four selection voltages selected from the selection voltages $V_G$0 to $V_G$255 based on the gamma correction data as the reference voltages V0 to V63.

The DAC 56 generates a data voltage corresponding to the grayscale data output from the line latch 52 corresponding to each output line. Specifically, the DAC 56 selects the reference voltage corresponding to the grayscale data corresponding to one output line, output from the line latch 52, from the reference voltages V0 to V63 generated by the reference voltage generation circuit 54, and outputs the selected reference voltage as the data voltage.

The driver circuit 58 drives the output lines connected to the data lines of the LCD panel 20. Specifically, the driver circuit 58 drives each output line based on the data voltage generated by the DAC 56 corresponding to each output line. Specifically, the driver circuit 58 drives the data line based on the data voltage that is the reference voltage selected based on the grayscale data. The driver circuit 58 includes a voltage-follower-connected operational amplifier provided corresponding to each output line. The operational amplifier drives the corresponding output line based on the data voltage from the DAC 56.

Figure 5:
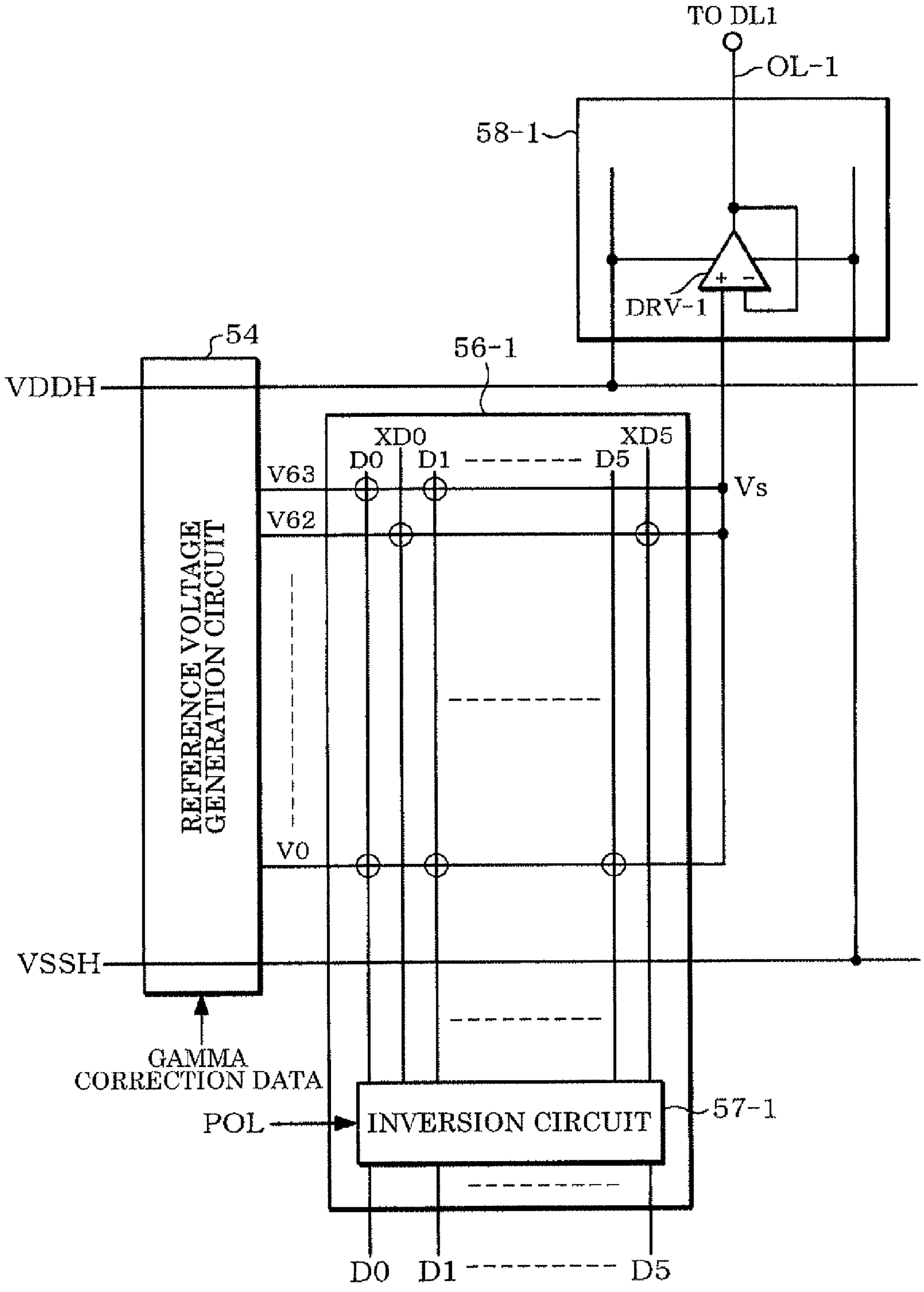
FIG. 5 is a view showing an outline of the configuration of a reference voltage generation circuit, a DAC, and a driver circuit shown in FIG. 4.

FIG. 5 shows an outline of the configuration of the reference voltage generation circuit 54, the DAC 56, and the driver circuit 58. FIG. 5 shows only the configuration of the driver circuit 58 which drives an output line OL-1 electrically connected to the data line DL1. Note that the following description similarly applies to other output lines.

The reference voltage generation circuit 54 outputs a plurality of voltages generated by dividing the voltage between the high-potential-side power supply voltage VDDH and the low-potential-side power supply voltage VSSH using a resistor circuit as the reference voltages V0 to V63. When employing polarity inversion drive, since positive voltages and negative voltages are not symmetrical, the reference voltage generation circuit 54 generates positive reference voltages and negative reference voltages. FIG. 5 shows either the positive reference voltages or the negative reference voltages.

A DAC 56-1 may be implemented by a ROM decoder circuit. The DAC 56-1 selects one of the reference voltages V0 to V63 based on 6-bit grayscale data, and outputs the selected reference voltage to an operational amplifier DRV-1 as a selected voltage Vs. The voltages selected based on the corresponding 6-bit grayscale data are similarly output to operational amplifiers DRV-2 to DRV-N.

The DAC 56-1 includes an inversion circuit 57-1. The inversion circuit 57-1 reverses the grayscale data based on the polarity reversal signal POL. 6-bit grayscale data D0 to D5 and 6-bit inverted grayscale data XD0 to XD5 are input to the DAC 56-1. The inverted grayscale data XD0 to XD5 is generated by reversing the grayscale data D0 to D5, respectively. The DAC 56-1 selects one of the multi-valued reference voltages V0 to V63 generated by the reference voltage generation circuit 54 based on the grayscale data.

For example, when the logic level of the polarity reversal signal POL is "H," the reference voltage V2 is selected corresponding to the 6-bit grayscale data D0 to D5 set at "000010" (=2). When the logic level of the polarity reversal signal POL is "L", the reference voltage is selected using the inverted grayscale data XD0 to XD5 generated by reversing the grayscale data D0 to D5. Specifically, the inverted display data XD0 to XD5 is set at "111101" (=61) so that the reference voltage V61 is selected.

The selected voltage Vs thus selected by the DAC 56-1 is supplied to the operational amplifier DRV-1.

The operational amplifier DRV-1 drives the output line OL-1 based on the selected voltage Vs. The power supply circuit 100 changes the voltage of the common electrode in synchronization with the polarity reversal signal POL, as described above. The polarity of the voltage applied to the liquid crystal is reversed in this manner.

4. Reference Voltage Generation Circuit

Figure 6:
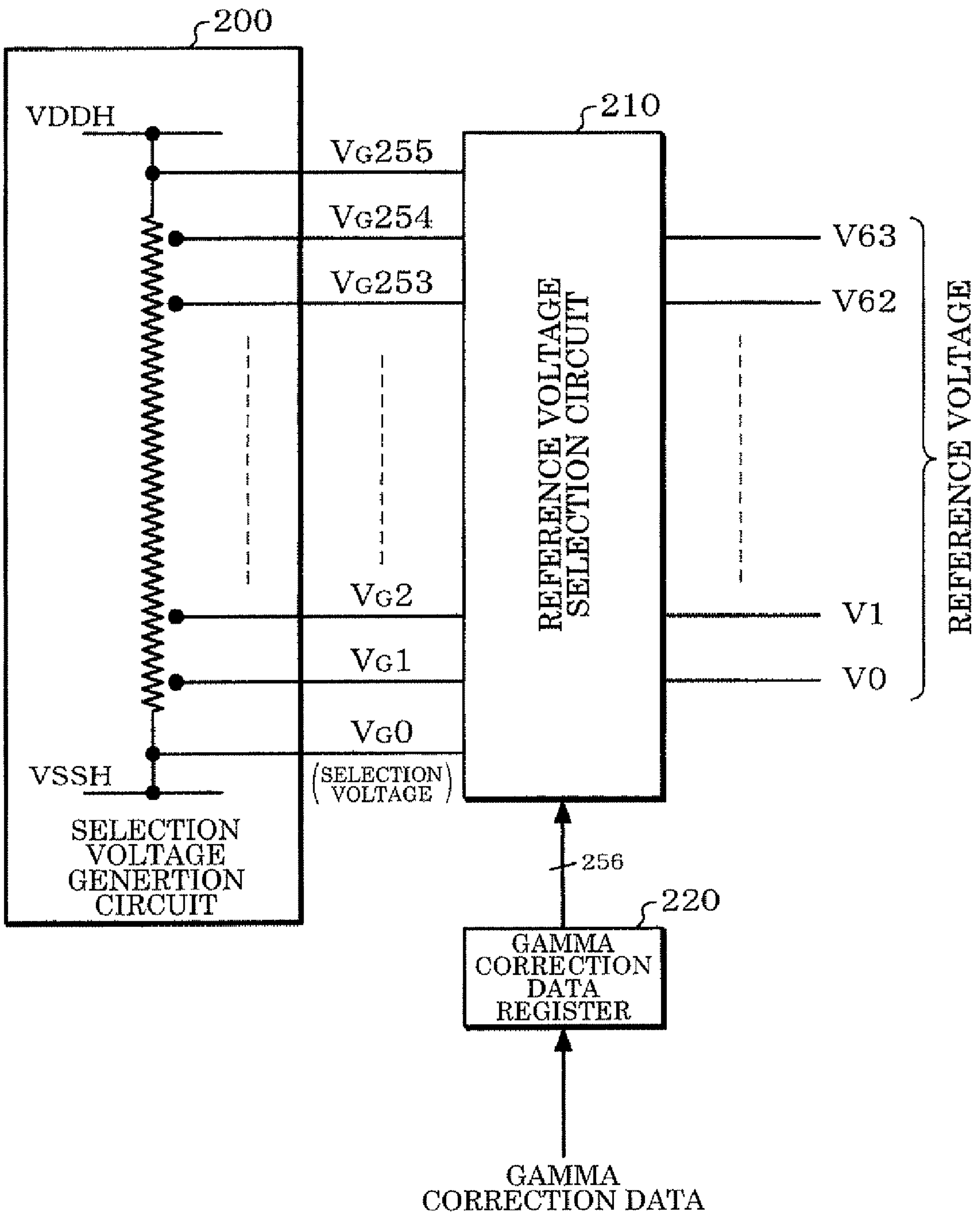
FIG. 6 is a block diagram showing a configuration example of a reference voltage generation circuit according to one embodiment of the invention.

FIG. 6 is a block diagram showing a configuration example of the reference voltage generation circuit 54 according to this embodiment.

The reference voltage generation circuit 54 includes a selection voltage generation circuit 200, a reference voltage selection circuit 210, and a gamma correction data register 220.

The selection voltage generation circuit 200 includes a ladder resistor circuit to which the high-potential-side power supply voltage VDDH and the low-potential-side power supply voltage VSSH are supplied at either end. The ladder resistor circuit includes a plurality of resistor elements connected in series. The selection voltage is output from an output node at which the resistor elements are electrically connected. It is desirable that the resistance of each resistor element be controlled (changed) by the host or the display controller 38.

The selection voltage generation circuit 200 outputs the selection voltages $V_G$0 to $V_G$255 (first to Lth selection voltages) arranged in potential ascending order. The selection voltage generation circuit 200 may output the selection voltages $V_G$0 to $V_G$255 arranged in potential descending order.

The L-bit gamma correction data is set in the gamma correction data register 220, the data of each bit of the gamma correction data being associated with one of the selection voltages and indicating whether or not to output the selection voltage as the reference voltage.

Figure 7:
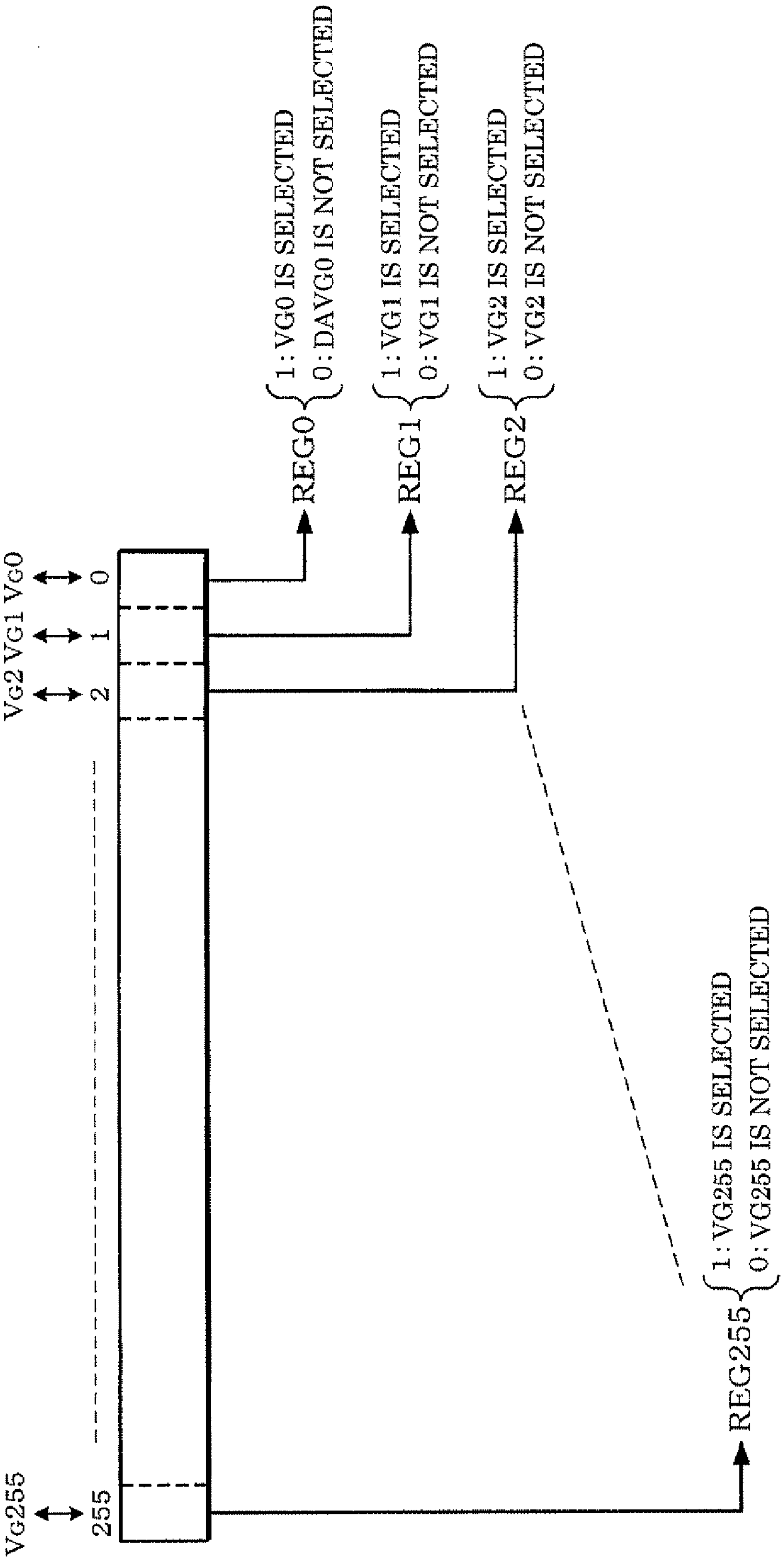
FIG. 7 is a view illustrative of gamma correction data according to one embodiment of the invention.

FIG. 7 is a view illustrative of the gamma correction data according to this embodiment.

When the number of selection voltages is L, the gamma correction data has an L-bit configuration. Therefore, the gamma correction data shown in FIG. 6 has a 256-bit configuration. The data of each bit of the gamma correction data indicates whether or not to output the corresponding selection voltage as the reference voltage. In this embodiment, the data of a bit set at "1" indicates that the selection voltage corresponding to the bit is output as the reference voltage, and the data of a bit set at "0" indicates that the selection voltage corresponding to the bit is not output as the reference voltage. Therefore, when the gamma correction data has a 256-bit configuration, only the data of 64 bits among the 256 bits is set at "1", and the remaining data is set at "0".

In FIG. 7, the data of the 255th bit (most significant bit) of the gamma correction data is REG255, and the data of the 0th bit (least significant bit) of the gamma correction data is REG0.

In FIG. 6, the reference voltage selection circuit 210 outputs 64 (=K) selection voltages selected from the selection voltages $V_G$0 to $V_G$255 (first to Lth selection voltages) based on the gamma correction data as the reference voltages V0 to V63 (first to Kth reference voltages) in potential ascending order. The reference voltage selection circuit 210 may output the reference voltages V0 to V63 arranged in potential descending order.

FIG. 8 is a view illustrative of an operation example of the reference voltage selection circuit shown in FIG. 6.

In FIG. 8, the least significant bit of the gamma correction data is set at "0", the second lowest bit is set at "1", the third lowest bit is set at "1", and the most significant bit is set at "1". Since the least significant bit of the gamma correction data is set at "0", the selection voltage $V_G$0 corresponding to the least significant bit is not output as the reference voltage.

On the other hand, since the second lowest bit of the gamma correction data is set at "1", the selection voltage $V_G$1 corresponding to the second lowest bit is output as the reference voltage. Therefore, the selection voltage $V_G$1 is output as the reference voltage V0.

Since the third lowest bit of the gamma correction data is set at "1", the selection voltage $V_G$2 corresponding to the third lowest bit is output as the reference voltage. Therefore, the selection voltage $V_G$2 is output as the reference voltage V1.

Likewise, since the second highest bit of the gamma correction data is set at "0", the selection voltage $V_G$254 corresponding to the second highest bit is not output as the reference voltage. On the other hand, since the most significant bit of the gamma correction data is set at "1", the selection voltage $V_G$255 corresponding to the most significant bit is output as the reference voltage. Therefore, the selection voltage $V_G$255 is output as the reference voltage V63.

This allows the reference voltage generation circuit 54 to generate K selection voltages selected from the first to Lth selection voltages arranged in potential descending order or potential ascending order as the first to Kth reference voltages arranged in potential descending order or potential ascending order.

Figure 9:
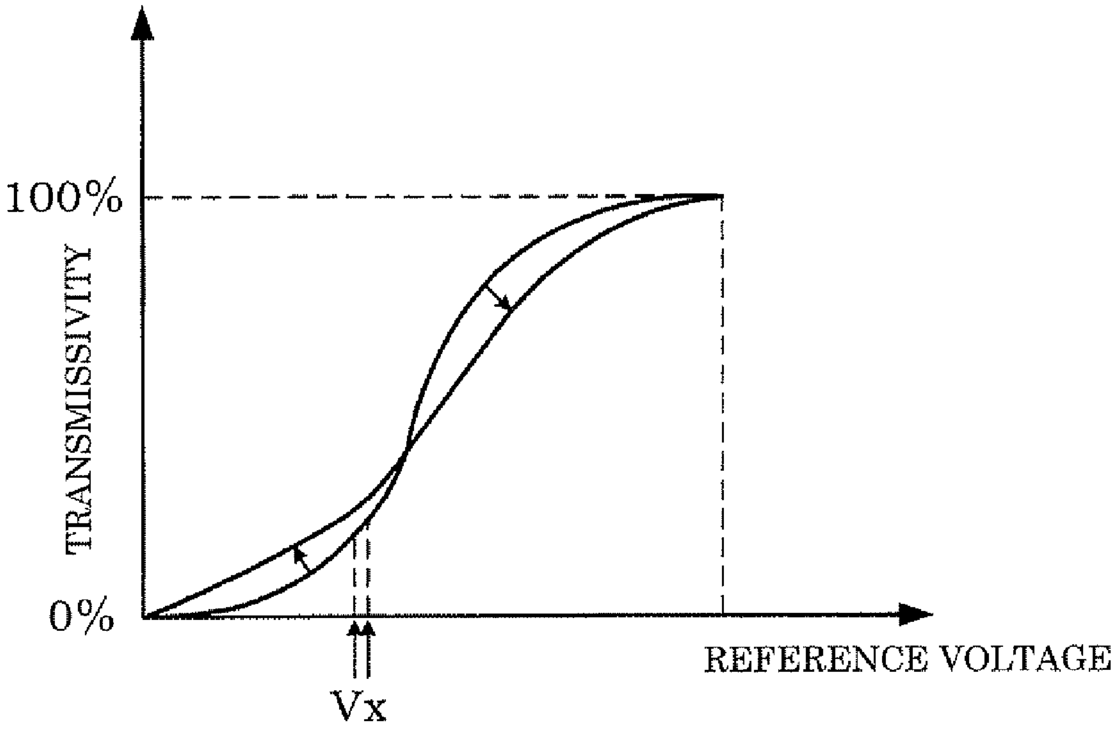
FIG. 9 is view illustrative of gamma characteristics.

FIG. 9 is a view illustrative of gamma characteristics.

In FIG. 9, the horizontal axis indicates the reference voltage, and the vertical axis indicates the pixel transmissivity. In this embodiment, the voltage level of the reference voltage Vx can be selected from the selection voltages so that a plurality of voltage levels can be output, as described above. This makes it possible to implement fine gamma correction corresponding to the type of LCD panel.

Moreover, the voltage levels of the reference voltages V0 to V63 output from the reference voltage generation circuit 54 can be varied by variably controlling the resistance of each resistor element of the ladder resistor circuit of the selection voltage generation circuit 200.

4.1 Reference Voltage Selection Circuit

The reference voltage selection circuit 210 according to this embodiment is described below. The reference voltage selection circuit 210 outputs L selection voltages selected from the K selection voltages arranged in potential descending order or potential ascending order as the L reference voltages arranged in potential descending order or potential ascending order. Therefore, the circuit scale increases when implementing the function of the reference voltage selection circuit 210 by merely utilizing a circuit.

Figure 10:
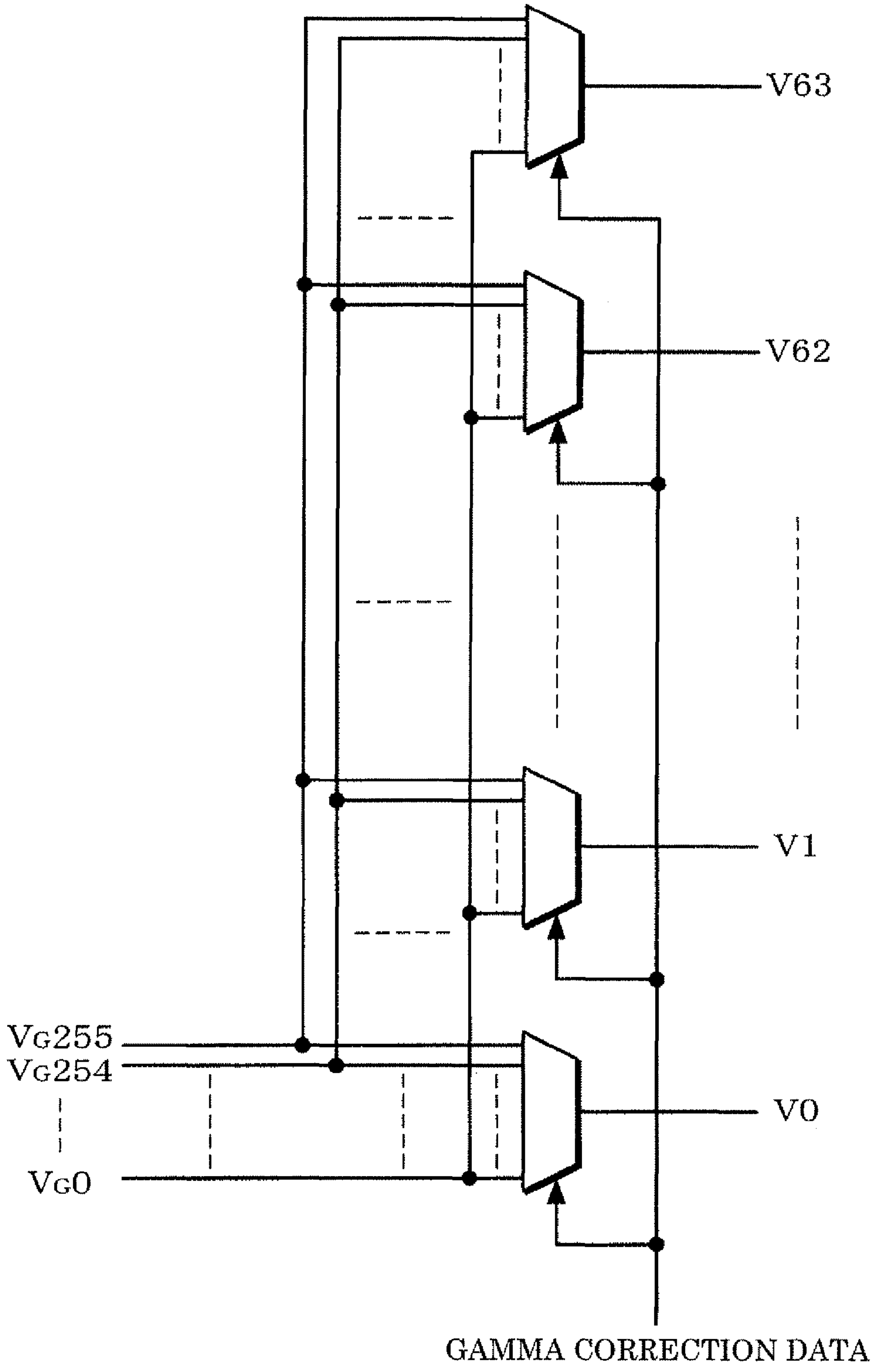
FIG. 10 is a block diagram showing a configuration example of a reference voltage selection circuit according to a comparative example of one embodiment of the invention.

FIG. 10 is a block diagram showing a configuration example of the reference voltage selection circuit 210 according to a comparative example of this embodiment.

In the comparative example, 256-input one-output selectors are provided corresponding to the reference voltages. In this case, each selector selects one of the selection voltages $V_G$0 to $V_G$255 based on the gamma correction data.

This makes it necessary to add a 256-input one-output selector when the number of reference voltages is increased. As a result, the circuit scale of not only the reference voltage selection circuit 210 but also the reference voltage generation circuit 54 increases, whereby power consumption increases.

In this embodiment, the function of the reference voltage selection circuit 210 is implemented using a switch matrix configuration, as described below. This suppresses an increase in circuit scale of the reference voltage selection circuit 210. Moreover, even if the number of selection voltages and the number of reference voltages are increased, an increase in circuit scale of the reference voltage selection circuit 210 is suppressed as compared with the comparative example.

Figure 11:
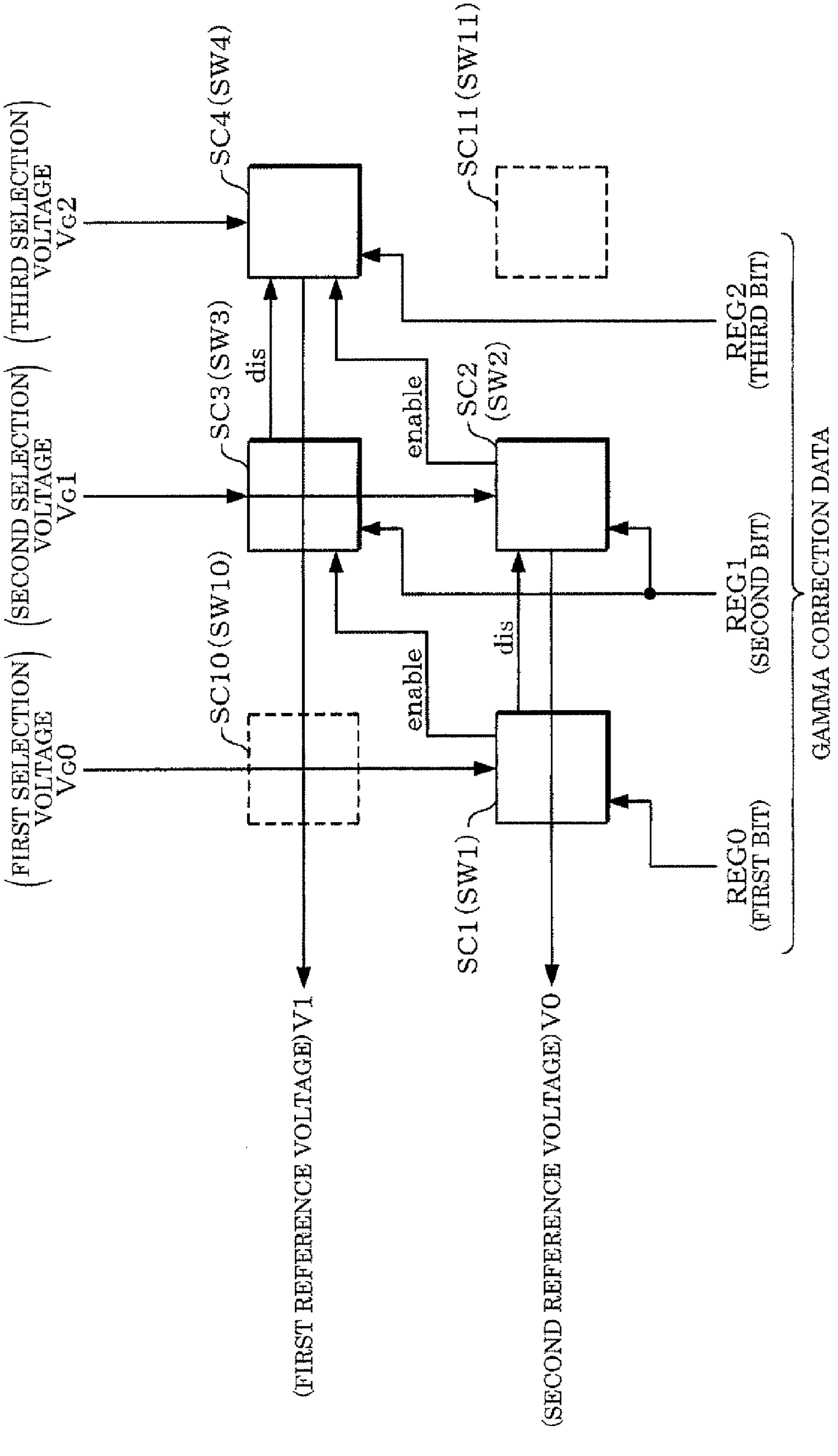
FIG. 11 is a block diagram showing a configuration example of a reference voltage selection circuit according to one embodiment of the invention.

FIG. 11 is a block diagram showing a configuration example of the reference voltage selection circuit 210 according to this embodiment. FIG. 11 shows an example in which the number of selection voltages is three ($V_G$0, $V_G$1 and $V_G$2) and the number of reference voltages is two (V0 and V1) for convenience of description. The reference voltage selection circuit 210 necessarily includes the configuration shown in FIG. 11 when the number of selection voltages is three or more and the number of reference voltages is two or more. Therefore, the reference voltage generation circuit 54 according to this embodiment that generates the first to Kth reference voltages arranged in potential descending order or potential ascending order may include a reference voltage selection circuit that outputs at least the first and second reference voltages among the first to Kth reference voltages.

The reference voltage selection circuit shown in FIG. 11 selects the first and second reference voltages V0 and V1 arranged in potential descending order or potential ascending order from the first to third selection voltages $V_G$0 to $V_G$2 arranged in potential descending order or potential ascending order.

The reference voltage selection circuit includes first to fourth switch elements SW1 to SW4. The first switch element SW1 is a switch circuit for outputting the first selection voltage $V_G$0 as the first reference voltage V0. The second switch element SW2 is a switch circuit for outputting the second selection voltage $V_G$1 as the first reference voltage V0. The third switch element SW3 is a switch circuit for outputting the second selection voltage $V_G$1 as the second reference voltage V1. The fourth switch element SW4 is a switch circuit for outputting the third selection voltage $V_G$2 as the second reference voltage V1. Each switch circuit electrically connects or disconnects a signal line to which the selection voltage is supplied and a signal line to which the reference voltage is output.

The first switch element SW1 outputs the first selection voltage $V_G$0 as the first reference voltage V0 on condition that the first switch element SW1 has been enabled based on the data REG0 of the first bit of the gamma correction data. The second switch element SW2 outputs the second selection voltage $V_G1$ as the first reference voltage V1 on condition that the second switch element SW2 has been disabled based on the data REG0 of the first bit of the gamma correction data and enabled based on the data REG1 of the second bit of the gamma correction data. The third switch element SW3 outputs the second selection voltage $V_G1$ as the second reference voltage V1 on condition that the third switch element SW3 has been enabled based on the data REG0 of the first bit of the gamma correction data and enabled based on the data REG1 of the second bit of the gamma correction data. The fourth switch element SW4 outputs the third selection voltage VG2 as the second reference voltage V1 on condition that the fourth switch element SW4 has been enabled based on the data REG0 of the first bit of the gamma correction data, disabled based on the data REG1 of the second bit of the gamma correction data, and enabled based on the data REG2 of the third bit of the gamma correction data.

The reference voltage selection circuit shown in FIG. 11 may include first to fourth switch cells SC1 to SC4 respectively including the first to fourth switch elements SW1 to SW4. Each switch cell ON/OFF-controls the switch element provided therein based on the enable signal and the disable signal supplied from other switch cells, and outputs the enable signal and the disable signal to other switch cells.

Figure 12A:
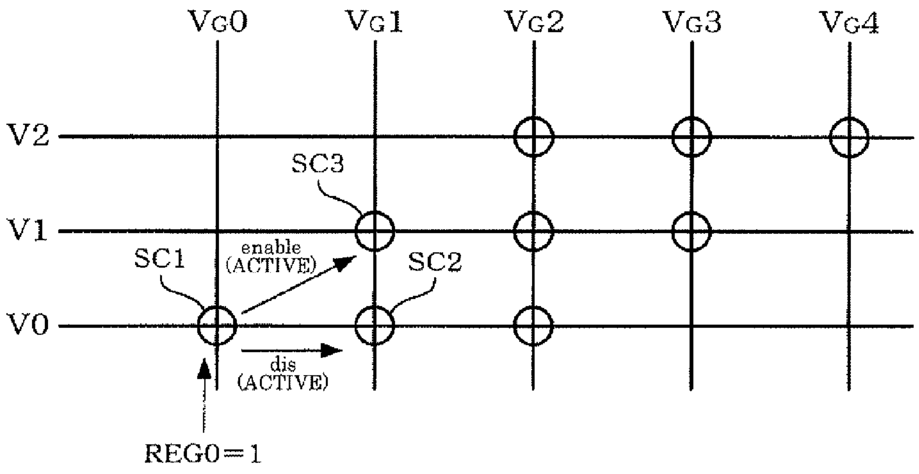
FIGS. 12A and 12B are views illustrative of an enable signal and a disable signal output from one switch cell to other switch cells.
Figure 12B:
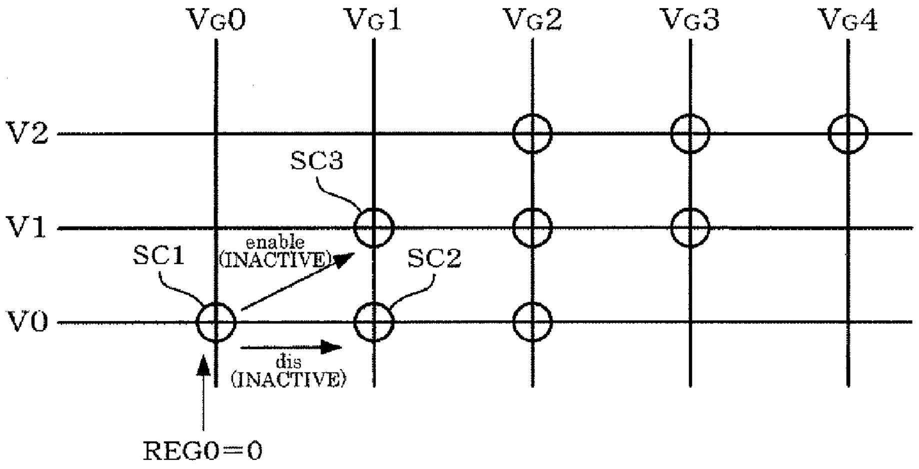

FIGS. 12A and 12B are views illustrative of the enable signal and the disable signal output from one switch cell to other switch cells. FIGS. 12A and 12B show an example in which three reference voltages are selected from four selection voltages.

In FIG. 12A, when the first switch cell SC1 has been enabled based on the data REG0 of the first bit of the gamma correction data, the first switch cell SC1 activates a disable signal "dis" supplied to the second switch cell SC2, and activates an enable signal "enable" supplied to the third switch cell.

The second switch cell SC2 ON/OFF-controls the second switch element SW2 included in the second switch cell SC2 using the disable signal "dis" supplied from the first switch cell SC1. Likewise, the third switch cell SC3 ON/OFF-controls the third switch element SW3 included in the third switch cell SC3 using the enable signal "enable" supplied from the first switch cell SC1.

In FIG. 12B, when the first switch cell SC1 has been disabled based on the data REG0 of the first bit of the gamma correction data, the first switch cell SC1 deactivates the disable signal "dis" supplied to the second switch cell SC2, and deactivates the enable signal "enable" supplied to the third switch cell.

In this case, the second switch cell SC2 ON/OFF-controls the second switch element SW2 included in the second switch cell SC2 using the disable signal "dis" supplied from the first switch cell SC1 in the same manner as in FIG. 12A. The third switch cell SC3 ON/OFF-controls the third switch element SW3 included in the third switch cell SC3 using the enable signal "enable" supplied from the first switch cell SC1.

Specifically, when the first switch cell SC1 has been enabled based on the data REG0 of the first bit of the gamma correction data, the first switch cell SC1 activates the disable signal "dis" supplied to the second switch cell SC2, and activates the enable signal "enable" supplied to the third switch cell SC3. When the first switch cell SC1 has been disabled based on the data REG0 of the first bit of the gamma correction data, the first switch cell SC1 deactivates the disable signal "dis" supplied to the second switch cell SC2, and deactivates the enable signal "enable" supplied to the third switch cell SC3.

The second switch cell SC2 outputs the second selection voltage $V_G1$ as the first reference voltage V0 and activates the enable signal "enable" supplied to the fourth switch cell SC4 on condition that the second switch cell SC2 has been enabled based on the data REG1 of the second bit of the gamma correction data and the disable signal "dis" supplied from the first switch cell SC1 is inactive. Otherwise the second switch cell SC2 deactivates the enable signal "enable" supplied to the fourth switch cell SC4.

The third switch cell SC3 outputs the second selection voltage $V_G1$ as the second reference voltage V1 and activates the disable signal "dis" supplied to the fourth switch cell SC4 on condition that the third switch cell SC3 has been enabled based on the data REG1 of the second bit of the gamma correction data and the enable signal "enable" supplied from the first switch cell SC1 is active. Otherwise the third switch cell SC3 deactivates the disable signal "dis" supplied to the fourth switch cell SC4.

The fourth switch cell SC4 outputs the third selection voltage $V_G2$ as the second reference voltage V1 on condition that the fourth switch cell SC4 has been enabled based on the data REG2 of the third bit of the gamma correction data, the disable signal "dis" supplied from the third switch cell SC3 is inactive, and the enable signal "enable" supplied from the second switch cell SC2 is active.

It suffices to connect identical switch cells by propagating the enable signal and the disable signal as described above, whereby the design and a change in design of the reference voltage selection circuit are facilitated. Note that the disable signal may be propagated as the enable signal.

FIG. 13 shows an operation example of the reference voltage selection circuit shown in FIG. 11.

As shown in FIG. 13, the reference voltage selection circuit shown in FIG. 11 outputs the first and second reference voltages V0 and V1 arranged in potential descending order or potential ascending order from the first to third selection voltages $V_G0$ to $V_G2$ arranged in potential descending order or potential ascending order based on the data of bits of the 3-bit gamma correction data set at "1".

The number of switch elements or switch cells can be reduced even when implementing the reference voltage selection circuit using a switch matrix configuration by propagating the signals (enable signal and disable signal) as described above utilizing the switch elements or the switch cells including the switch elements.

In general, when implementing a circuit which selects the first and second reference voltages V0 and V1 from the first to third selection voltages $V_G1$ to $V_G2$ using a switch matrix configuration, it is necessary to provide six (=3×2) switch elements or switch cells.

On the other hand, the third selection voltage $V_G2$ is not output as the first reference voltage V0 taking into consideration the characteristics in which two reference voltages are output in potential descending order or potential ascending order. Likewise, the first selection voltage $V_G0$ is not output as the second reference voltage V1. Therefore, the switch element SW10 (switch cell SC10 including the switch element SW10) and the switch element SW11 (switch cell SC11 including the switch element SW11) can be omitted in FIG. 11.

In this embodiment, the reference voltage selection circuit selects the first to Kth reference voltages arranged in potential descending order or potential ascending order from the first to Lth selection voltages arranged in potential descending order or potential ascending order. Therefore, (L−K+1) switch cells are necessary in this embodiment for outputting one reference voltage. Therefore, the reference voltage selection circuit may be implemented using K×(L−K+1) switch cells.

A specific circuit configuration example of the reference voltage selection circuit according to this embodiment is described below.

Figure 14:
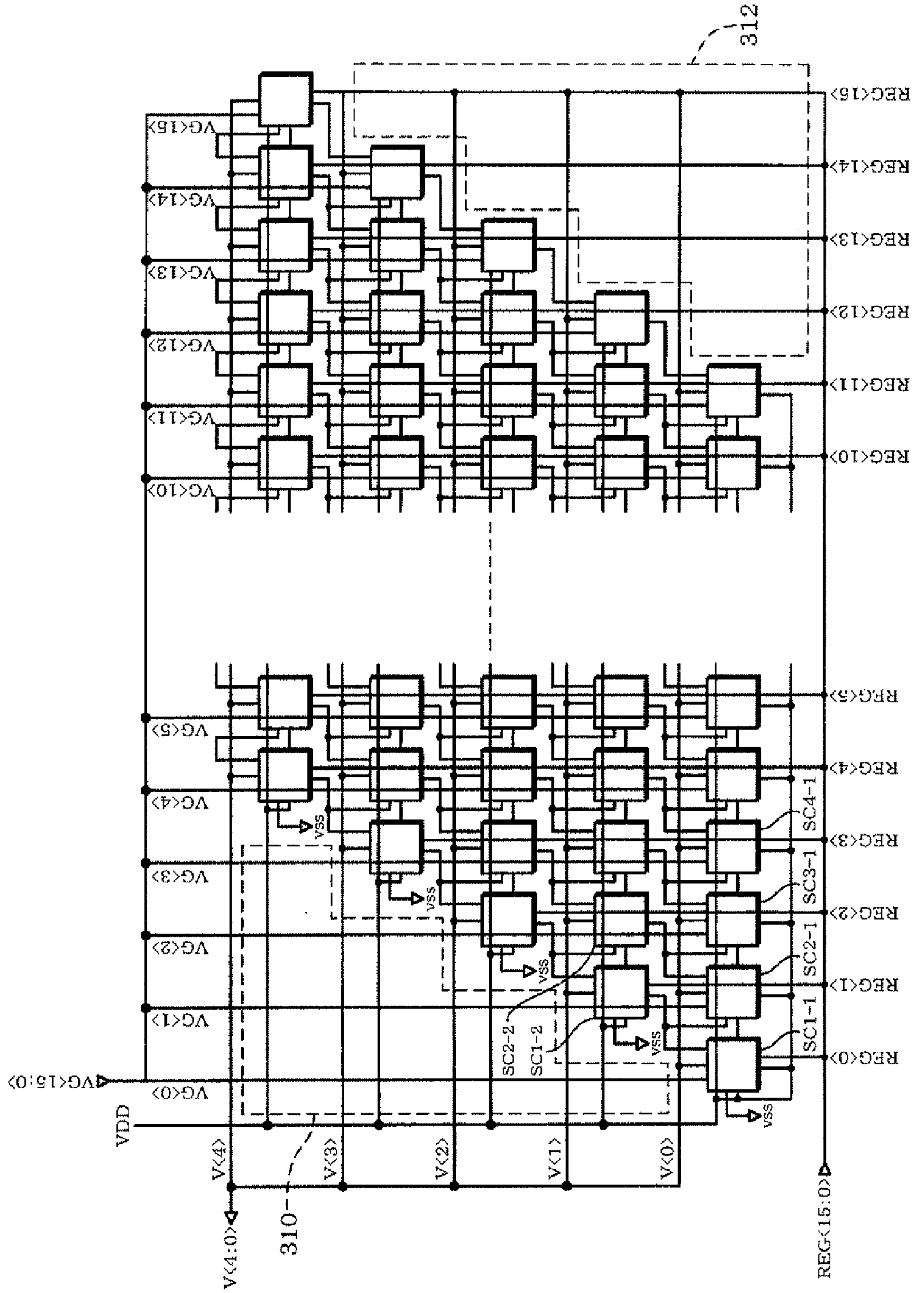
FIG. 14 is a view showing a specific circuit configuration example of a reference voltage selection circuit according to one embodiment of the invention.

FIG. 14 shows a specific circuit configuration example of the reference voltage selection circuit according to this embodiment. FIG. 14 shows a configuration example in which L is sixteen (first to sixteenth selection voltages $V_G$0 to $V_G$15) and K is five (first to fourth reference voltages V0 to V4).

Data VG<15:0> indicates the first to sixteenth selection voltages $V_G$0 to $V_G$15. The selection voltage is supplied to the signal line for each bit of the data VG<15:0>. Data V<4:0> indicates the first to fourth reference voltages V0 to V4. Each reference voltage is output to the signal line for each bit of the data V<4:0>. Data REG<15:0> indicates the 16-bit gamma correction data.

While 80 (=5×16) switch cells are necessary when merely employing a switch matrix configuration, the reference voltage selection circuit according to this embodiment can be implemented using 60 (5×(16−5+1)) switch cells. This is because the switch cells in circuit areas 310 and 312 shown in FIG. 14 can be omitted for the above-described reason.

Figure 15:
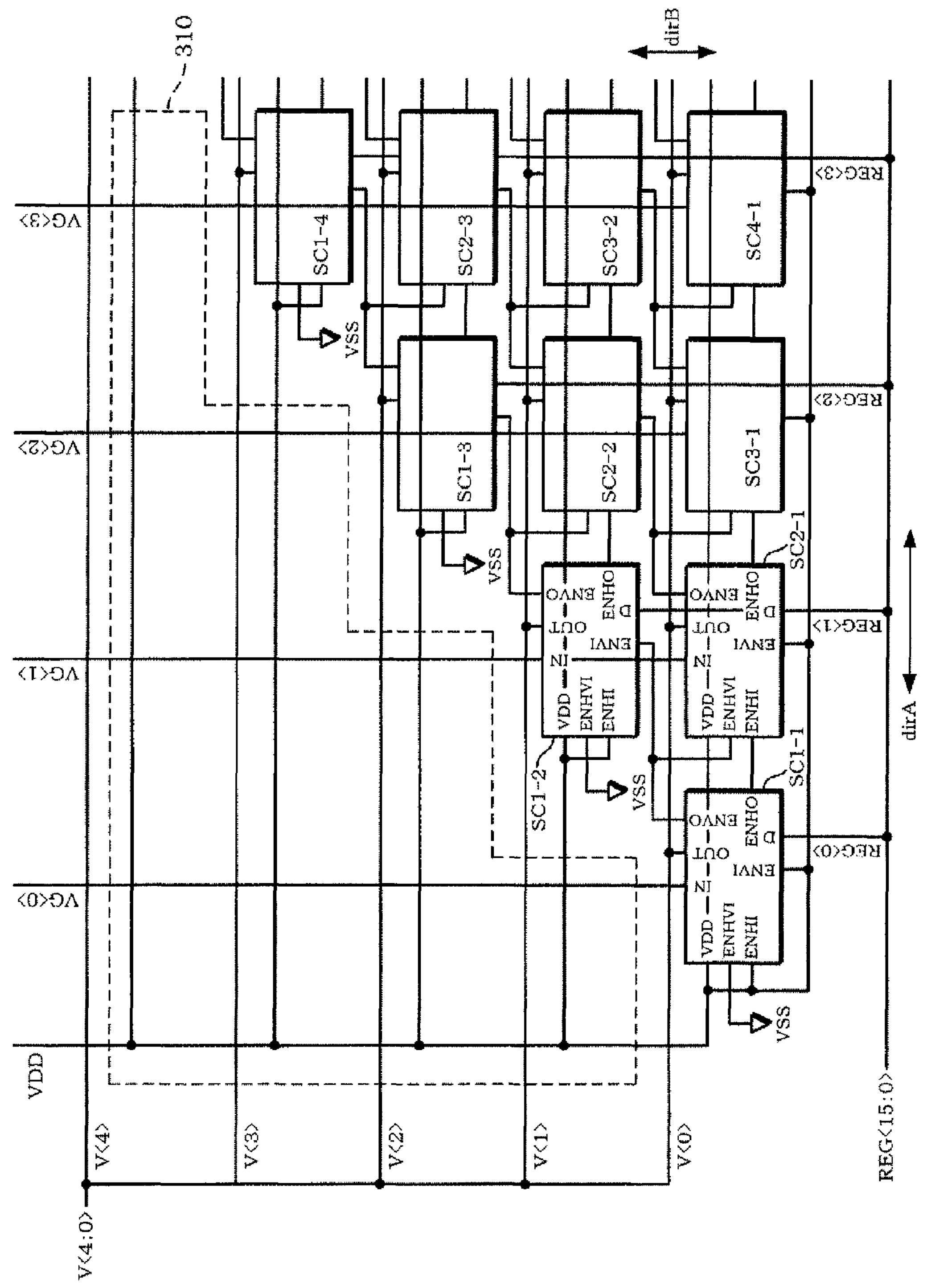
FIG. 15 is an enlarged view showing part of the circuit diagram shown in FIG. 14.

FIG. 15 is an enlarged view showing part of the circuit diagram shown in FIG. 14.

In FIG. 15, the same sections as in FIG. 14 are indicated by the same symbols. Description of these sections is appropriately omitted. In FIG. 15, switch cells SC1-1, SC2-1, SC3-1, SC4-1, . . . , SC1-2, SC2-2, . . . have an identical configuration.

Each switch cell includes a VDD terminal, an ENHVI terminal, an ENHI terminal, an ENVI terminal, a D terminal, an ENHO terminal, an ENVD terminal, an OUT terminal, and an IN terminal.

The VDD terminal is a terminal to which the high-potential-side power supply voltage VDD (high-potential-side power supply voltage VDDH) is supplied. Note that a terminal to which the low-potential-side power supply voltage VSS (ground power supply voltage VSSH) is supplied is shown in FIG. 15. The ENHVI terminal is a terminal to which the enable signal "enable" supplied to the cells arranged in a direction dirB is input. The ENHI terminal is a terminal to which the enable signal "enable" (equivalent to the disable signal "dis" of which the logic level is reversed) supplied to the cells arranged in a direction dirA is input. The ENVI terminal is a terminal to which the enable signal "enable" supplied to the cells arranged in the direction dirB is input. The ENHO terminal is a terminal from which the enable signal "enable" (equivalent to the disable signal "dis" of which the logic level is reversed) supplied to the cells arranged in the direction dirA is output. The D terminal is a terminal to which the data of each bit of the gamma correction data is input. The ENVD terminal is a terminal from which the enable signal "enable" supplied to the cells arranged in the direction dirB is output. The OUT terminal is a terminal from which the reference voltage is supplied. The IN terminal is a terminal to which the selection voltage is supplied.

Therefore, the reference voltage selection circuit may include the first to fourth switch cells SC1-1, SC2-1, SC1-2, and SC2-2, as shown in FIG. 15. The first switch cell SC1-1 includes a first switch element for outputting the first selection voltage among the first to third selection voltages arranged in potential descending order or potential ascending order as the first reference voltage among the first and second reference voltages arranged in potential descending order or potential ascending order. The second switch cell SC1-2 includes a second switch element for outputting the second selection voltage as the first reference voltage. The third switch cell SC1-2 includes a third switch element for outputting the second selection voltage as the second reference voltage. The fourth switch cell SC2-2 includes a fourth switch element for outputting the third selection voltage as the second reference voltage.

The data of the first bit of the 1-bit gamma correction data is supplied to the first switch cell SC1-1, the data of each bit of the gamma correction data being associated with one of the selection voltages and indicating whether or not to output the selection voltage as the reference voltage. The first switch cell SC1-1 outputs the enable signal to the second and third switch cells SC2-1 and SC1-2. The data of the second bit of the gamma correction data is supplied to the second switch cell SC2-1. The second switch cell SC2-1 outputs the enable signal to the third and fourth switch cells SC1-2 and SC2-2. The data of the second bit of the gamma correction data is supplied to the third switch cell SC1-2. The third switch cell SC1-2 outputs the enable signal to the fourth switch cell SC2-2. The data of the third bit of the gamma correction data is supplied to the fourth switch cell SC2-2.

In FIG. 15, the disable signal "dis" is output as the enable signal "enable". This is because the enable signal "enable" set to active is equivalent to the disable signal "dis" set to inactive, and the enable signal "enable" set to inactive is equivalent to the disable signal "dis" set to active.

4.2 Switch Cell

It is desirable that the switch cell of the reference voltage selection circuit according to this embodiment has the following circuit configuration taking the configuration of the reference voltage selection circuit into consideration.

Figure 16:
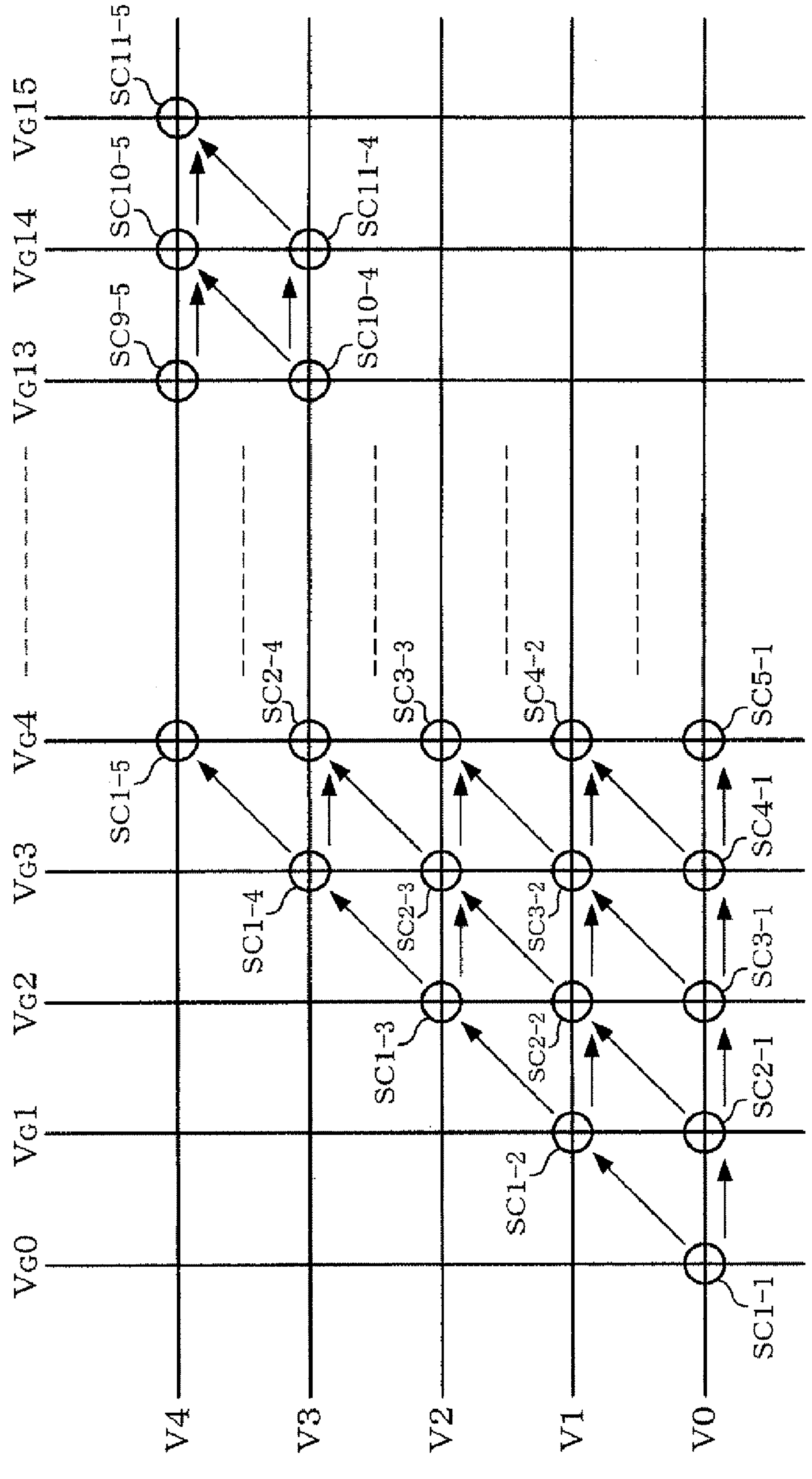
FIG. 16 is a schematic view showing the connection relationship between switch cells of a reference voltage selection circuit according to one embodiment of the invention.

FIG. 16 schematically shows the connection relationship between the switch cells of the reference voltage selection circuit according to this embodiment.

The reference voltage selection circuit according to this embodiment selects a plurality of reference voltages between the high-potential-side power supply voltage VDDH and the low-potential-side power supply voltage VSSH. The reference voltage selection circuit outputs selection voltages selected based on the gamma correction data from the first to sixteenth selection voltages $V_G$0 to $V_G$15 between the high-potential-side power supply voltage VDDH and the low-potential-side power supply voltage VSSH as the reference voltages.

The switch element of the switch cell to which the selection voltage is supplied may be formed using a transfer gate, for example. The transfer gate includes a p-type (first conductivity type in a broad sense) metal-oxide-semiconductor (MOS) transistor and an n-type (second conductivity type in a broad sense) MOS transistor. The source of the p-type MOS transistor is connected to the source of the n-type MOS transistor, and the drain of the p-type MOS transistor is connected to the drain of the n-type MOS transistor.

As shown in FIG. 16, a current that flows through a power supply line to which the ground power supply voltage VSSH (low-potential-side power supply voltage) is supplied may unrestrictedly flow through the switch cell SC1-1 to which the first selection voltage $V_G$0 is input. Likewise, a current that flows through a power supply line to which the high-potential-side power supply voltage VDD (VDDH) is supplied may unrestrictedly flow through the switch cell SC11-5 to which the sixteenth selection voltage $V_G$15 is input. In particular, since the high-potential-side power supply voltage VDDH and the ground power supply voltage VSSH are supplied from the outside of the data driver 30, noise (e.g., static electricity and radio wave) is easily mixed into the power supply lines to which the high-potential-side power supply voltage VDDH and the ground power supply voltage VSSH are supplied.

Specifically, when the ground power supply voltage VSSH is supplied as the first selection voltage $V_G$0, the potential of the power supply line to which the first selection voltage $V_G$0 is supplied may change due to static electricity, an external radio wave, or the like. A direct current flows through the node of the switch element of the first switch cell SC1-1 so that a large amount of stress occurs. Therefore, when the potential of the power supply line becomes lower than the ground potential, the switch element of the first switch cell SC1-1 through which a large current flows is likely to be destroyed.

When the ground power supply voltage VSSH is supplied as the sixteenth selection voltage $V_G$0, the potential of the power supply line to which the sixteenth selection voltage $V_G$15 is supplied may change due to static electricity, an external radio wave, or the like. A direct current flows through the node of the switch element of the switch cell SC11-5 so that a large amount of stress occurs. Therefore, when the potential of the power supply line becomes higher than the high-potential-side power supply voltage, the switch element of the switch cell SC11-5 through which a large current flows is likely to be destroyed.

On the other hand, since the selection voltages are supplied to other switch cells through the ladder resistor circuit, a current that flows through other switch cells is limited.

Therefore, it is desirable to limit a current that flows through the switch elements of the first switch cell SC1-1 and the switch cell SC11-5, or to enhance current resistance of the switch elements of the first switch cell SC1-1 and the switch cell SC11-5.

When limiting a current that flows through the switch elements of the first switch cell SC1-1 and the switch cell SC11-5, since the gamma characteristics change to a large extent when changing the potential level of the first or sixteenth selection voltage $V_G$0 or $V_G$15, as shown in FIG. 6, a resistor circuit cannot be provided in order to limit a current that flows through the signal line to which the first or sixteenth selection voltage $V_G$0 or $V_G$15 is supplied. Therefore, it is necessary to limit a current that flows through the signal line to which the first or sixteenth selection voltage $V_G$0 or $V_G$15 is supplied without providing a resistor circuit.

4.2.1 First Configuration Example

In a first configuration example, the current resistance of the switch element of the first switch cell SC1-1 is enhanced.

Figure 17:
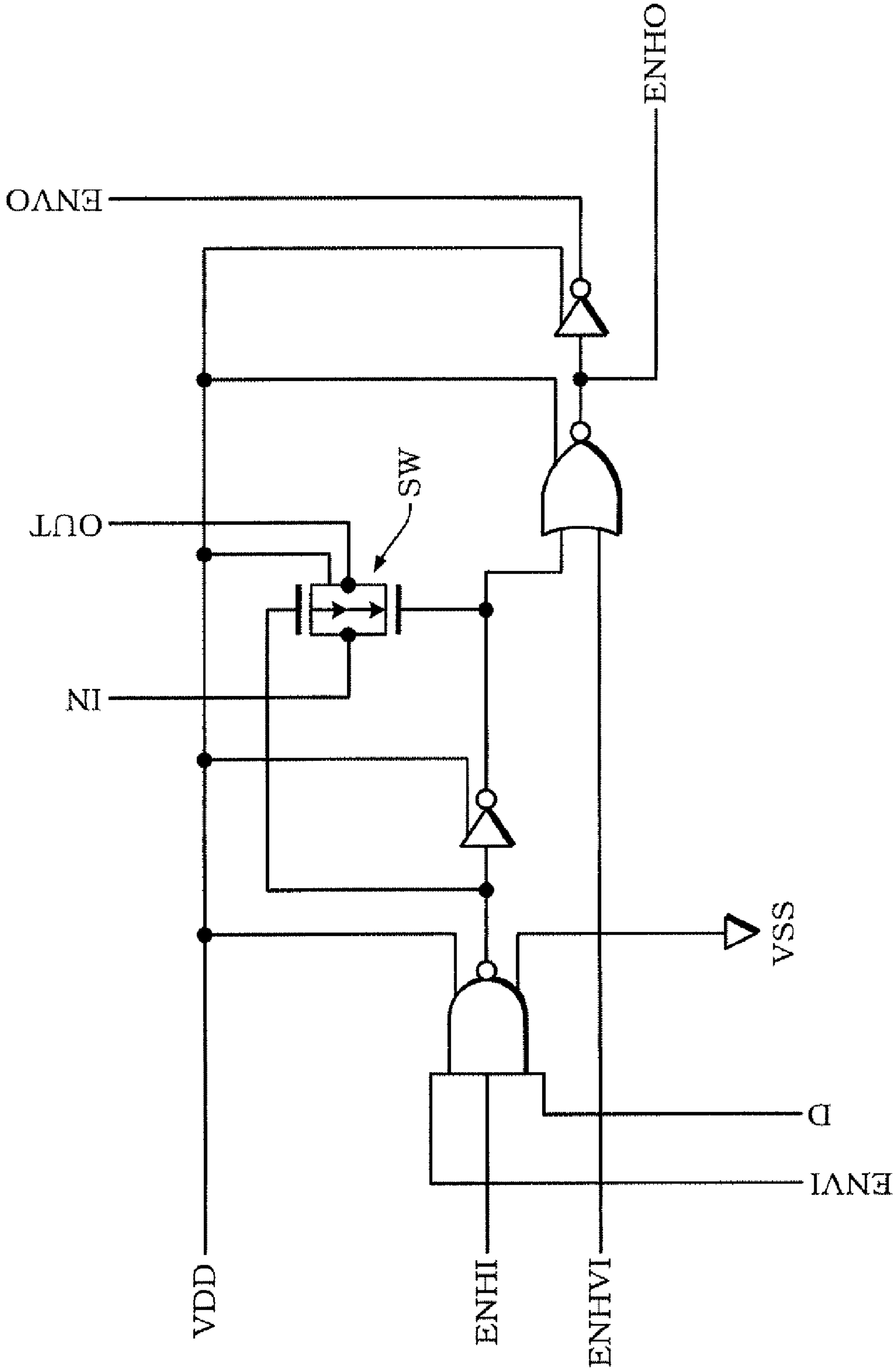
FIG. 17 is a view showing a first configuration example of a circuit of a switch cell shown in FIG. 15.

FIG. 17 shows the first configuration example of the circuit of the switch cell shown in FIG. 15.

In FIG. 17, the switch element SW is formed using a transfer gate. Specifically, the switch element SW includes a p-type MOS transistor and an n-type MOS transistor. The source of the p-type MOS transistor is connected to the source of the n-type MOS transistor, and the drain of the p-type MOS transistor is connected to the drain of the n-type MOS transistor The sources of the p-type MOS transistor and the n-type MOS transistor are electrically connected to the IN terminal, and the drains of the p-type MOS transistor and the n-type MOS transistor are electrically connected to the OUT terminal.

When the AND result of the signals input through the ENVI terminal, the D terminal, and the ENHI terminal is "H", the switch element SW is set in a conducting state so that the IN terminal and the OUT terminal are set at the same potential. When the AND result is "L", the switch element SW is set in a non-conducting state. The OR result of the AND result and the signal input through the ENHVI terminal is output from the ENVO terminal. The inversion result of the OR result of the AND result and the signal input through the ENHVI terminal is output from the ENHO terminal.

In the first configuration example, the current density of the channel regions of the transistors of the switch element of the first switch cell SC1-1 to which the ground power supply voltage VSSH is supplied as the first selection voltage $V_G$0 is set to be lower than the current density of the channel regions of the transistors of the switch elements of other switch cells excluding the switch cell SC11-5. Specifically, when focusing on the first to fourth switch cells SC1-1, SC2-1, SC1-2, and SC2-2, the current density of the channel regions of the transistors of the first switch element is lower than the current density of the channel regions of the transistors of the second to fourth switch elements.

For example, when the channel width of the transistor (e.g., n-type MOS transistor) of the switch element is referred to as W and the channel length of the transistor is referred to as L, the ratio W/L of the transistor of the first switch element is set to be larger than the ratio W/L of the transistors of the second to fourth switch elements. Specifically, the ratio W/L of the transistor of the first switch element is set to be equal to or larger than twice the ratio W/L of the transistors of the second to fourth switch elements.

This makes it possible to enhance the current resistance of the switch element of the first switch cell. Therefore, a possibility that the switch element of the first switch cell SC1-1 is destroyed can be significantly reduced even if the potential of the power supply line to which the first selection voltage $V_G$0 is supplied has become lower than the ground potential.

4.2.2 Second Configuration Example

In a second configuration example, a current that flows through the switch element of the first switch cell SC1-1 is limited instead of, or in addition to, the first configuration example.

Figure 18:
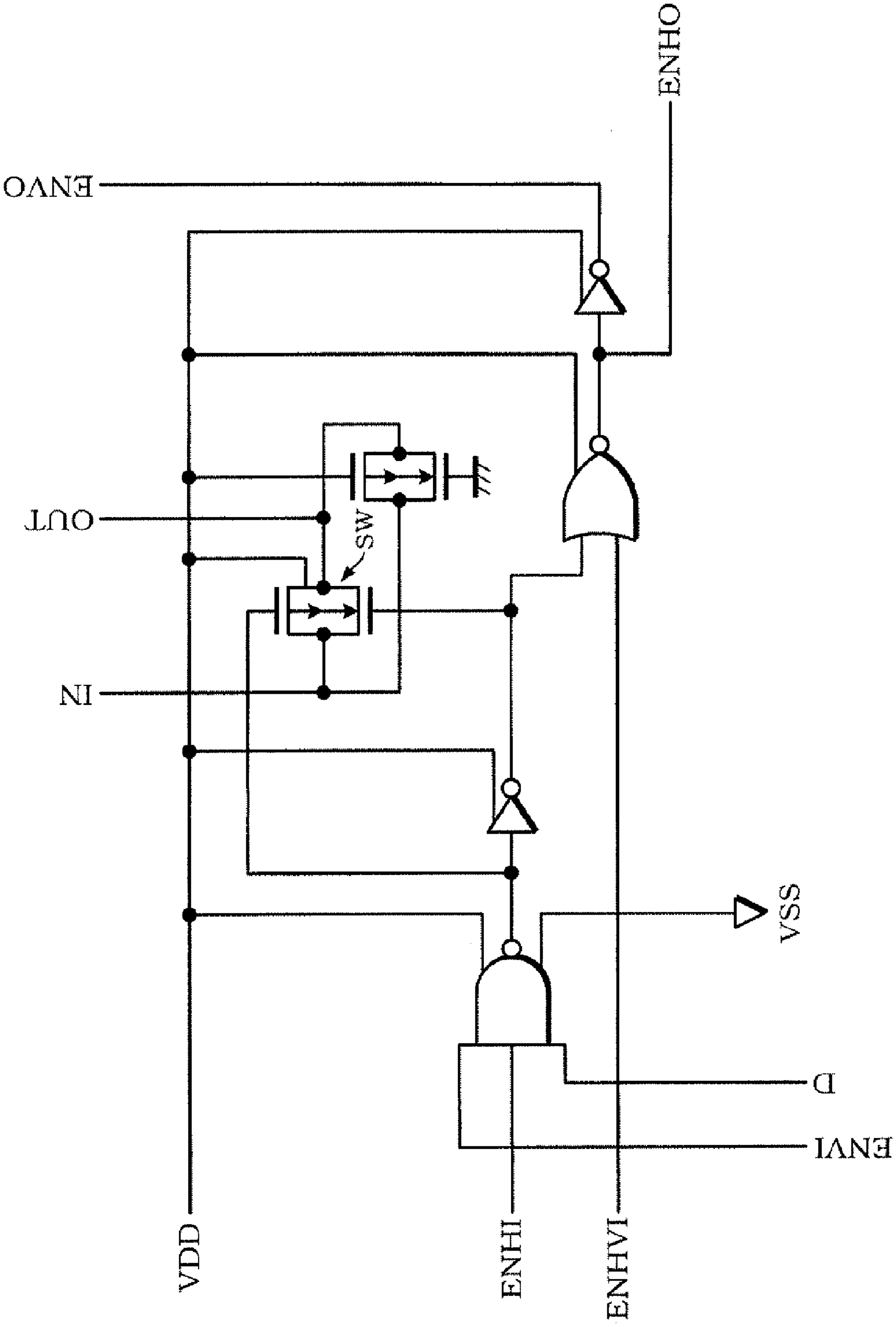
FIG. 18 is a view showing a second configuration example of a circuit of a switch cell shown in FIG. 15.

FIG. 18 shows the second configuration example of the circuit of the switch cell shown in FIG. 15.

In FIG. 18, the same sections as in FIG. 17 are indicated by the same symbols. Description of these sections is appropriately omitted.

The second configuration example differs from the first configuration example in that a bypass circuit is provided in parallel with the switch element. The bypass circuit bypasses the switch element SW when the potential of the first selection voltage $V_G$0 is lower than the ground potential. Specifically, when the potential of the first selection voltage $V_G$0 is lower than the ground potential, a bypass path is formed so that a current does not flow between the source and the drain of the transistor of the switch element.

An off-transistor circuit may be employed as the bypass circuit. The off-transistor circuit has a configuration similar to that of the transfer gate. A p-type MOS transistor of a transfer gate is connected in parallel with a p-type MOS transistor of the off-transistor circuit, and an n-type MOS transistor of the transfer gate is connected in parallel with an n-type MOS transistor of the off-transistor circuit. The high-potential-side power supply voltage VDDH is supplied to the gate of the p-type MOS transistor of the off-transistor circuit, and the ground power supply voltage VSSH is supplied to the gate of the n-type MOS transistor of the off-transistor circuit. Therefore, the source and the drain of the off-transistor circuit are set in a non-conducting state during normal operation.

Specifically, the bypass circuit includes an n-type MOS transistor, the ground power supply voltage being supplied to the gate of the n-type MOS transistor, and a p-type MOS transistor, the source and the drain of the p-type MOS transistor being respectively connected to the source and the drain of the n-type MOS transistor and the high-potential-side power supply voltage being supplied to the gate of the p-type MOS transistor The bypass circuit is provided in parallel with the switch element of the first switch cell SC1-1.

Therefore, when employing the switch cell having the configuration shown in FIG. 18 as the first switch cell SC11-1, the n-type MOS transistor of the off-transistor circuit is set in a conducting state when the potential of the power supply line to which the first selection voltage $V_G$0 is supplied has become lower than the ground potential so that a current that flows through the switch element can be bypassed. This reliably prevents a situation in which the switch element of the first switch cell SC1-1 is destroyed.

When only the first switch cell SC1-1 is formed using the switch cell shown in FIG. 18, the switch elements of all the switch cells of the reference voltage selection circuit can be formed to have an identical size. The bypass circuit according to the second configuration example may be employed for the first switch cell SC1-1 in addition to the first configuration example.

4.2.3 Third Configuration Example

In a third configuration example, the current resistance of the switch element of the first switch cell SC1-1 is enhanced instead of, or in addition to, the first or second configuration example.

Figure 19:
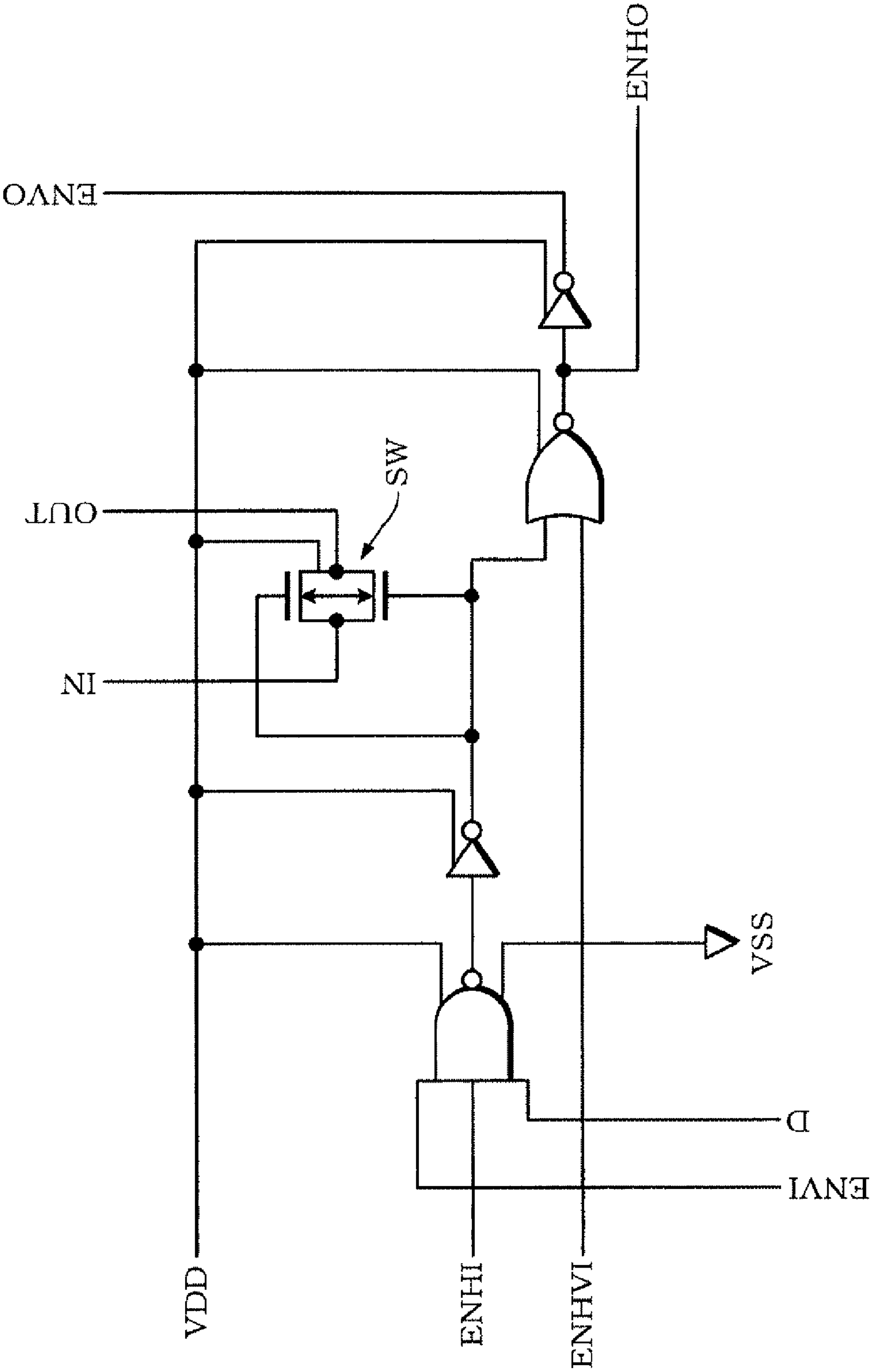
FIG. 19 is a view showing a third configuration example of a circuit of a switch cell shown in FIG. 15.

FIG. 19 shows the third configuration example of the circuit of the switch cell shown in FIG. 15.

In FIG. 19, the same sections as in FIG. 17 are indicated by the same symbols. Description of these sections is appropriately omitted.

The third configuration example differs from the first configuration example in that the switch element is formed using an n-type pass transistor instead of the transfer gate. In the third configuration example, the size of the n-type MOS transistor can be increased (the current density of the channel region can be reduced) by disregarding the operational range in which only the p-type MOS transistor operates as the operational range of the switch element. The switch cell shown in FIG. 19 is used as the first switch cell SC1-1.

In the third configuration example, since the n-type MOS transistor can be formed in the area in which the p-type MOS transistor is formed in the first configuration example, a reference voltage selection circuit with higher reliability can be provided with the same area as that of the first configuration example.

4.2.4 Fourth Configuration Example

The first to third configuration examples focus on the first switch cell SC1-1. A fourth configuration example prevents destruction of the switch element of the switch cell SC11-5.

In the fourth configuration example, the current resistance of the switch element of the switch cell SC11-5 is enhanced instead of or in addition to, the first to third configuration examples.

The configuration of the switch cell SC11-5 according to the fourth configuration example is similar to that shown in FIG. 17. Therefore, illustration and detailed description of the switch cell SC11-5 according to the fourth configuration example are omitted.

In the fourth configuration example, the current density of the channel regions of the transistors of the switch element of the first switch cell SC11-5 to which the high-potential-side power supply voltage VDDH is supplied as the sixteenth selection voltage $V_G$15 is set to be lower than the current density of the channel regions of the transistors of the switch elements of other switch cells excluding the first switch cell SC1-1. Specifically, when focusing on the switch cell SC10-4 (first switch element in a broad sense), the switch cell SC11-4 (second switch element in a broad sense), the switch cell SC10-5 (third switch element in a broad sense), and the switch cell SC11-5 (fourth switch element in a broad sense) shown in FIG. 16, the current density of the channel regions of the transistors of the switch element of the switch cell SC11-5 (fourth switch element) is set to be lower than the current density of the channel regions of the transistors of the switch elements of the switch cells SC10-4, SC11-4, and SC10-5 (first to third switch elements).

For example, when the channel width of the transistor (e.g., ntype MOS transistor) of the switch element is referred to as W and the channel length of the transistor is referred to as L, the ratio W/L of the transistor of the switch element (fourth switch element) of the switch cell SC11-5 is set to be larger than the ratio W/L of the transistors of the switch elements (first to third switch elements) of the switch cells SC10-4, SC11-4, and SC10-5. Specifically, the ratio W/L of the transistor of the switch element (fourth switch element) of the switch cell SC11-5 is set to be equal to or larger than twice the ratio W/L of the transistors of the switch elements (first to third switch elements) of the switch cells SC10-4, SC11-4, and SC10-5.

This makes it possible to enhance the current resistance of the switch element of the switch cell SC11-5. Therefore, a possibility that the switch element of the switch cell SC11-5 is destroyed can be significantly reduced even if the potential of the power supply line to which the sixteenth selection voltage $V_G$15 is supplied has become higher than the high-potential-side power supply voltage.

4.2.5 Fifth Configuration Example

In a fifth configuration example, a current that flows through the switch element of the switch cell SC11-5 is limited instead of, or in addition to, the first to fourth configuration examples.

The configuration of the switch cell SC11-5 according to the fourth configuration example is similar to that shown in FIG. 18. Therefore, illustration and detailed description of the switch cell SC11-5 according to the fifth configuration example are omitted.

In the fifth configuration example, a bypass circuit is provided in parallel with the switch element. The bypass circuit bypasses the switch element SW when the potential of the sixteenth selection voltage $V_G$15 is higher than the potential of the high-potential-side power supply voltage. Specifically, when the potential of the sixteenth selection voltage $V_G$15 is higher than the potential of the high-potential-side power supply voltage, a bypass path is formed so that a current does not flow between the source and the drain of the transistor of the switch element.

An off-transistor circuit may be employed as the bypass circuit. The off-transistor circuit has a configuration similar to that of the transfer gate. A p-type MOS transistor of the transfer gate is connected in parallel with a p-type MOS transistor of the off-transistor circuit, and an n-type MOS transistor of the transfer gate is connected in parallel with an n-type MOS transistor of the off-transistor circuit. The high-potential-side power supply voltage VDDH is supplied to the gate of the p-type MOS transistor of the off-transistor circuit, and the ground power supply voltage VSSH is supplied to the gate of the n-type MOS transistor of the off-transistor circuit.

Specifically, the bypass circuit includes an n-type MOS transistor, the ground power supply voltage being supplied to the gate of the n-type MOS transistor, and a p-type MOS transistor, the source and the drain of the p-type MOS transistor being respectively connected to the source and the drain of the n-type MOS transistor and the high-potential-side power supply voltage being supplied to the gate of the p-type MOS transistor. The bypass circuit is provided in parallel with the switch element of the switch cell SC11-5.

Therefore, when employing the switch cell having the configuration shown in FIG. 18 as the switch cell SC11-5, the p-type MOS transistor of the off-transistor circuit is set in a conducting state when the potential of the power supply line to which the sixteenth selection voltage $V_G$15 is supplied has become higher than the high-potential-side power supply potential so that a current that flows through the switch element can be bypassed. This reliably prevents a situation in which the switch element of the switch cell SC11-5 is destroyed.

When only the switch cell SC11-5 is formed using the switch cell shown in FIG. 18, the switch elements of all the switch cells of the reference voltage selection circuit can be formed to have an identical size. The bypass circuit according to the fifth configuration example may be employed for the switch cell SC11-5 in addition to the fourth configuration example.

4.2.6 Sixth Configuration Example

In a sixth configuration example, the current resistance of the switch element of the switch cell SC11-5 is enhanced instead of, or in addition to, the first to fifth configuration examples.

Figure 20:
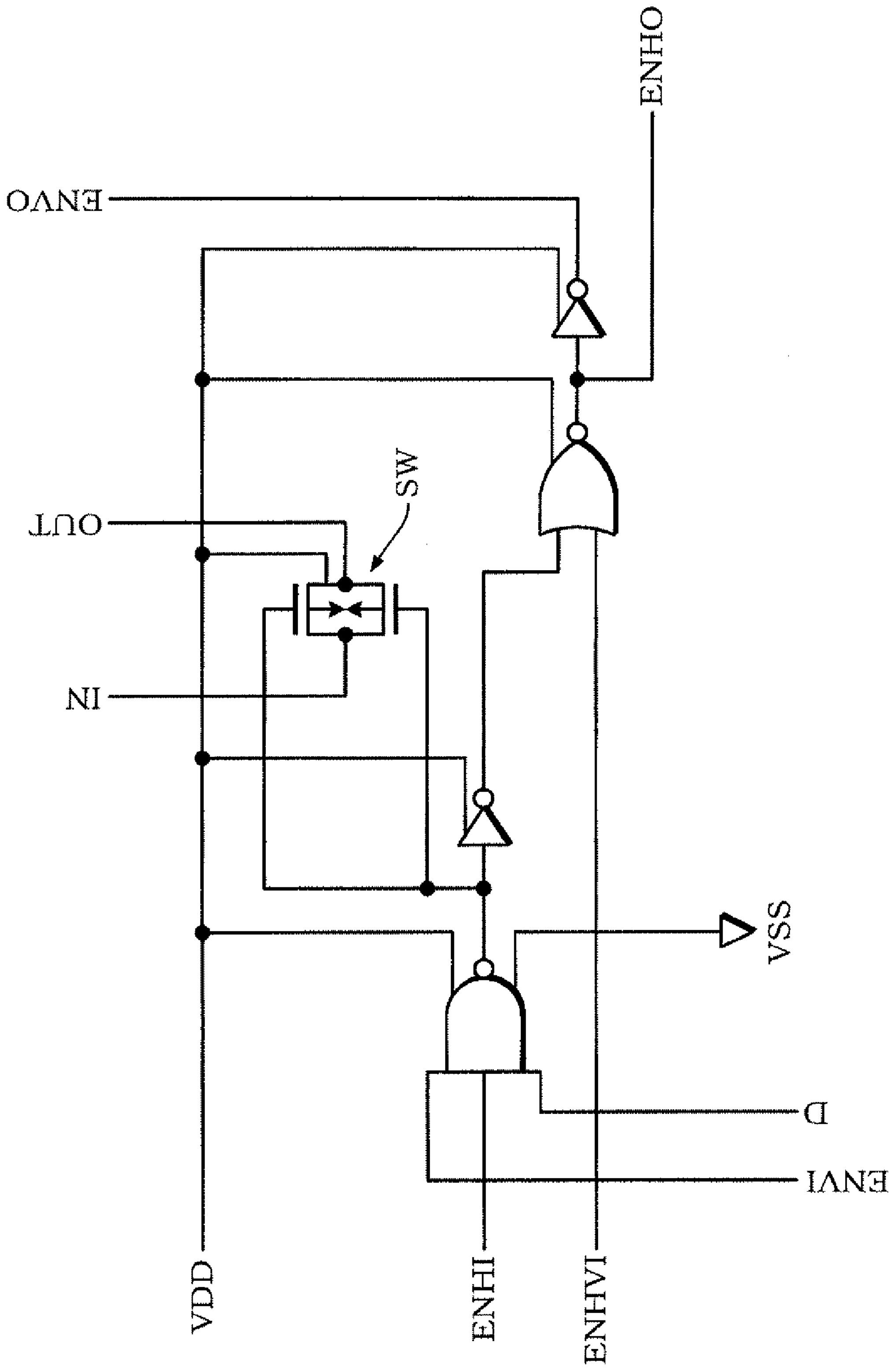
FIG. 20 is a view showing a sixth configuration example of a circuit of a switch cell shown in FIG. 15.

FIG. 20 shows the sixth configuration example of the circuit of the switch cell shown in FIG. 15.

In FIG. 20, the same sections as in FIG. 19 are indicated by the same symbols. Description of these sections is appropriately omitted.

The sixth configuration example differs from the fourth configuration example in that the switch element is formed using a p-type pass transistor instead of the transfer gate. In the sixth configuration example, the size of the p-type MOS transistor can be increased (the current density of the channel region can be reduced) by disregarding the operational range in which only the n-type MOS transistor operates as the operational range of the switch element. The switch cell shown in FIG. 20 is used as the switch cell SC11-5.

In the sixth configuration example, since the p-type MOS transistor can be formed in the area in which the n-type MOS transistor is formed in the fourth configuration example, a reference voltage selection circuit with higher reliability can be provided with the same area as that of the fourth configuration example.

Figure 21A:
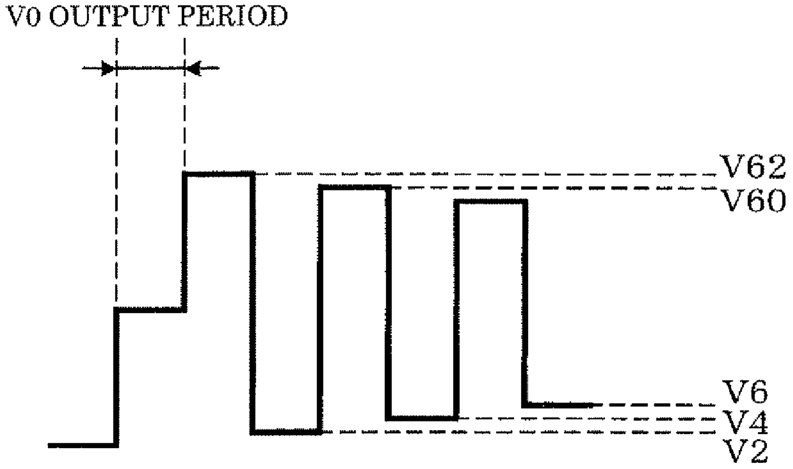
FIGS. 21A and 21B are views illustrative of effects of the first to third configuration examples.
Figure 21B:
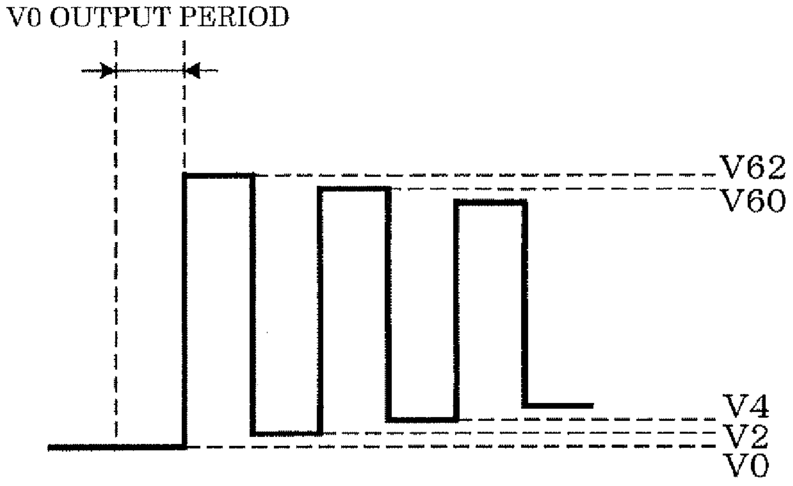

4.3 Views Illustrative of Effects 4.3.1 Effects of First to Third Configuration Examples FIGS. 21A and 21B are views illustrative of the effects of the first to third configuration examples.

FIG. 21A shows a state before applying the first to third configuration examples. FIG. 21A schematically shows a drive waveform example of the data driver 30 when the grayscale value corresponding to the 6-bit grayscale data is sequentially increased from "0" to "63" every drive period utilizing scan line inversion drive.

FIG. 21B schematically shows a drive waveform example of the data driver 30 when the grayscale value corresponding to the 6-bit grayscale data is sequentially increased from "0" to "63" every drive period utilizing scan line inversion drive while applying the first to third configuration examples.

In FIG. 21A, a large current may flow through the switch element of the first switch cell SC1-1 so that the switch element may be destroyed. As a result, the output of the reference voltage V0 of the reference voltage selection circuit may be set in a high impedance state. In this case, the source output is set in a high impedance state in a V0 output period in which the reference voltage V0 corresponding to the grayscale value "0" is output as the grayscale voltage so that the output level becomes variable. In the subsequent drive period, the polarity is reversed so that the reference voltage V62 corresponding to the grayscale value "1" is output. In the subsequent drive period, the polarity is reversed so that the reference voltage V2 corresponding to the grayscale value "2" is output. The reference voltage corresponding to the grayscale value is similarly output thereafter.

On the other hand, a situation in which the switch element of the first switch cell SC1-1 is destroyed can be prevented by applying the first to third configuration examples. Therefore, the reference voltage V0 is output in the V0 output period in which the reference voltage V0 corresponding to the grayscale value "0" is output as the grayscale voltage. In the subsequent drive period, the polarity is reversed so that the reference voltage V62 corresponding to the grayscale value "1" is output. In the subsequent drive period, the polarity is reversed so that the reference voltage V2 corresponding to the grayscale value "2" is output. The reference voltage corresponding to the grayscale value is similarly output thereafter.

4.3.2 Effects of Fourth to Sixth Configuration Examples

The following description is given on the assumption that k is 64.

Figure 22A:
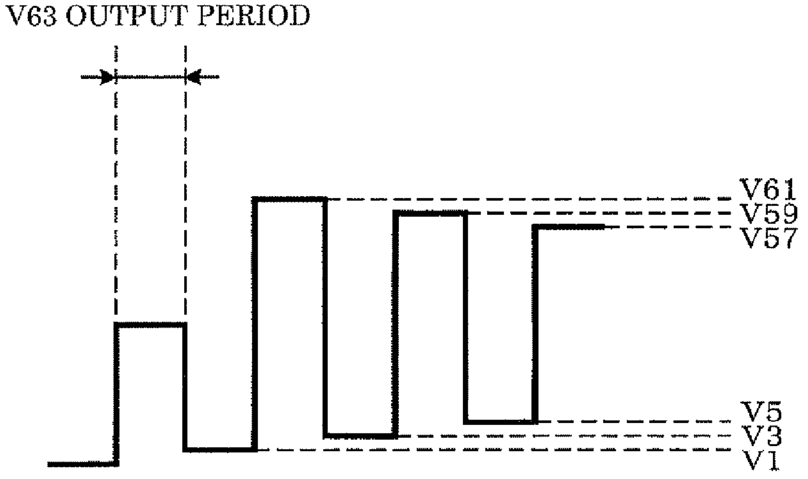
FIGS. 22A and 22B are views illustrative of effects of the fourth to sixth configuration examples.
Figure 22B:
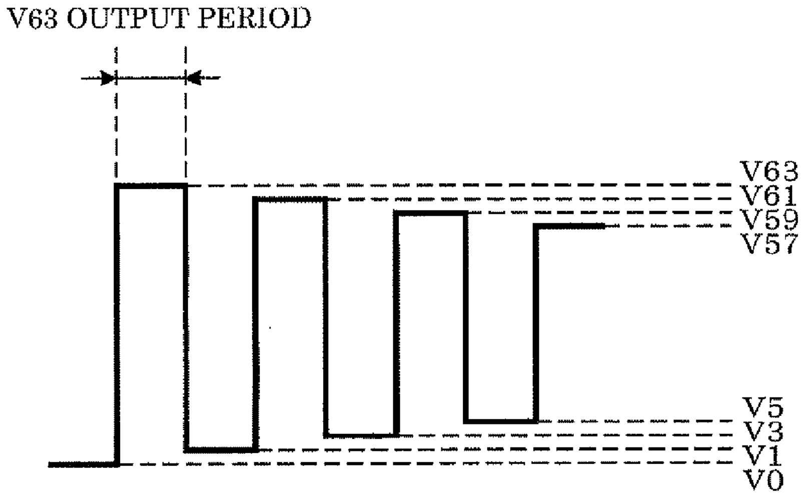

FIGS. 22A and 22B are views illustrative of the effects of the fourth to sixth configuration examples.

FIG. 22A shows a state before applying the fourth to sixth configuration examples. FIG. 22A schematically shows a drive waveform example of the data driver 30 when the grayscale value corresponding to 6-bit grayscale data is sequentially decreased from "63" to "0" every drive period utilizing scan line inversion drive.

FIG. 22B schematically shows a drive waveform example of the data driver 30 when the grayscale value corresponding to the 6-bit grayscale data is sequentially decreased from "63" to "0" every drive period utilizing scan line inversion drive while applying the fourth to sixth configuration examples.

In FIG. 22A, a large current may flow through the switch element of the switch cell SC11-5 so that the switch element may be destroyed. As a result, the output of the reference voltage V63 of the reference voltage selection circuit may be set in a high impedance state. In this case, the source output is set in a high impedance state in a V63 output period in which the reference voltage V63 corresponding to the grayscale value "63" is output as the grayscale voltage so that the output level becomes variable. In the subsequent drive period, the polarity is reversed so that the reference voltage V1 corresponding to the grayscale value "62" is output. In the subsequent drive period, the polarity is reversed so that the reference voltage V61 corresponding to the grayscale value "61" is output. The reference voltage corresponding to the grayscale value is similarly output thereafter.

On the other hand, a situation in which the switch element of the switch cell SC11-5 is destroyed can be prevented by applying the fourth to sixth configuration examples. Therefore, the reference voltage V63 is output in the V63 output period in which the reference voltage V63 corresponding to the grayscale value "63" is output as the grayscale voltage. In the subsequent drive period, the polarity is reversed so that the reference voltage V1 corresponding to the grayscale value "62" is output. In the subsequent drive period, the polarity is reversed so that the reference voltage V61 corresponding to the grayscale value "61" is output. The reference voltage corresponding to the grayscale value is similarly output thereafter.

5. Electronic Instrument

Figure 23:
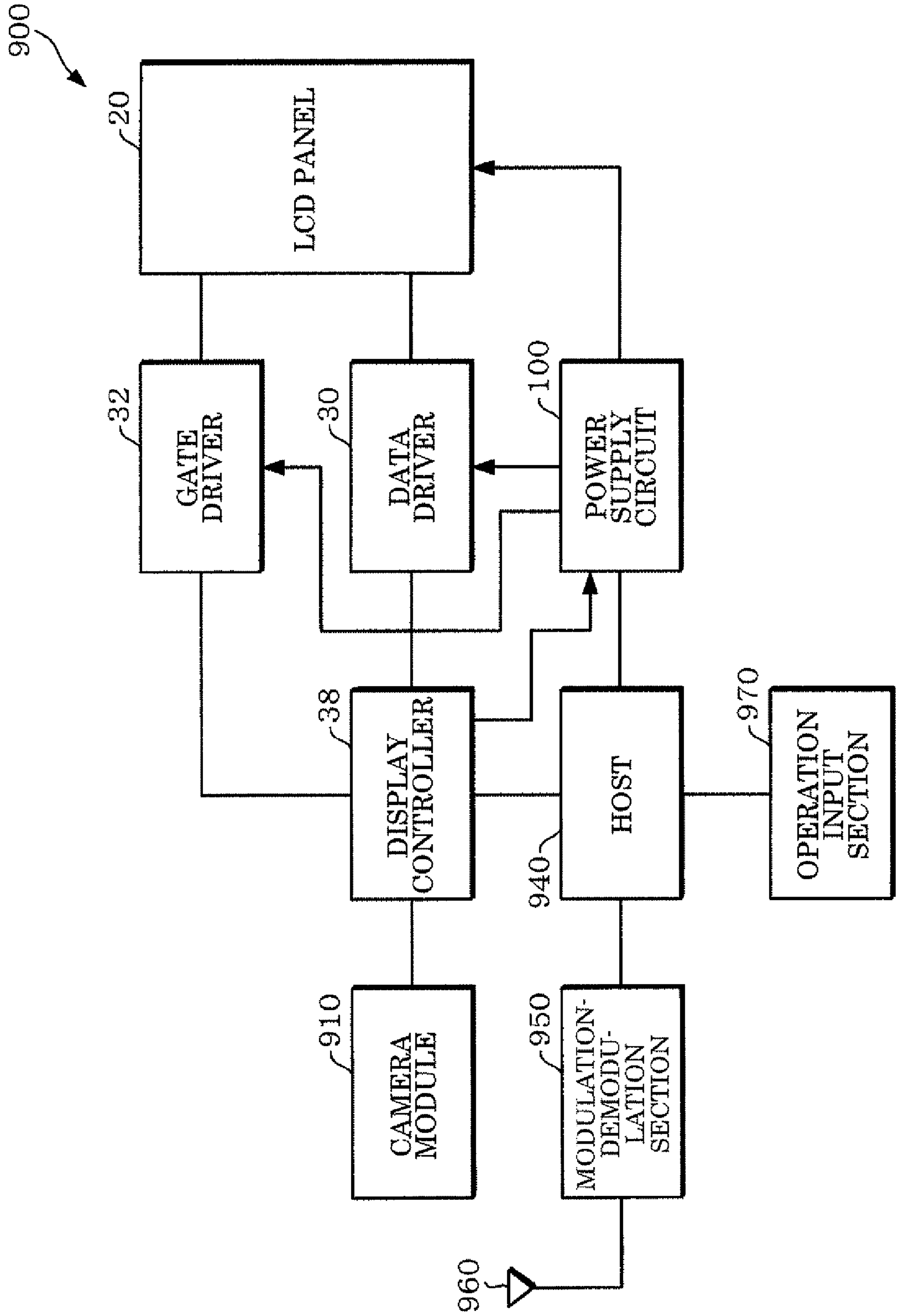
FIG. 23 is a block diagram showing a configuration example of an electronic instrument according to one embodiment of the invention.

FIG. 23 is a block diagram showing a configuration example of an electronic instrument according to one embodiment of the invention. FIG. 23 is a block diagram showing a configuration example of a portable telephone as an example of the electronic instrument. In FIG. 23, the same sections as in FIG. 1 or 2 are indicated by the same symbols. Description of these sections is appropriately omitted.

A portable telephone 900 includes a camera module 910. The camera module 910 includes a CCD camera, and supplies data relating to an image captured using the CCD camera to a display controller 38 in a YUV format.

The portable telephone 900 includes an LCD panel 20. The LCD panel 20 is driven by the data driver 30 and the gate driver 32. The LCD panel 20 includes a plurality of gate lines, a plurality of source lines, and a plurality of pixels.

The display controller 38 is connected to the data driver 30 and the gate driver 32, and supplies display data in an RGB format to the data driver 30.

The power supply circuit 100 is connected to the data driver 30 and the gate driver 32, and supplies drive power supply voltages to the data driver 30 and the gate driver 32. The power supply circuit 100 supplies the common electrode voltage Vcom to the common electrode of the LCD panel 20.

A host 940 is connected to the display controller 38. The host 940 controls the display controller 38. The host 940 demodulates display data received through an antenna 960 using a modulation-demodulation section 950, and supplies the demodulated display data to the display controller 38. The display controller 38 causes the data driver 30 and the gate driver 32 to display an image on the LCD panel 20 based on the display data.

The host 940 modulates display data generated by the camera module 910 using the modulation-demodulation section 950, and instructs transmission of the modulated data to another communication device through the antenna 960.

The host 940 transmits and receives display data, causes the camera module 910 to capture an image, and causes the LCD panel 20 to display an image based on operational information from an operation input section 970.

In the first to sixth configuration examples according to this embodiment, it is desirable to increases the number of contacts and holes in the formation area of the transistors of the switch elements of the first switch cell SC1-1 and the switch cell SC11-5 in order to enhance resistance against a large current.

The invention is not limited to the above-described embodiments. Various modifications and variations may be made without departing from the spirit and scope of the invention. For example, the invention may be applied not only to drive the above-mentioned liquid crystal display panel, but also to drive an electroluminescent display device, a plasma display device, and the like.

Some of the requirements of any claim of the invention may be omitted from a dependent claim that depends on that claim. Some of the requirements of any independent claim of the invention may be allowed to depend on any other independent claim.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the ground power supply voltage being supplied as the first selection voltage; and a current density of a channel region of a transistor that forms the first switch element being lower than a current density of a channel region of a transistor that forms a switch element among the second switch element, the third switch element, and the fourth switch element.

2. The reference voltage selection circuit as defined in claim 1, when a channel width of a transistor is referred to as W and a channel length of the transistor is referred to as L, a ratio W/L of the transistor that forms the first switch element being larger than a ratio W/L of the transistor that forms the switch element among the second switch element, the third switch element, and the fourth switch element.

3. The reference voltage selection circuit as defined in claim 1, the reference voltage selection circuit further including a first switch cell, a second switch cell, a third switch cell, and a fourth switch cell, each of the first switch cell, the second switch cell, the third switch cell, and the fourth switch cell including a switch element among the first switch element, the second switch element, the third switch element, and the fourth switch element, when the first switch cell has been enabled based on the data of the first bit of the gamma correction data, the first switch cell activating a disable signal supplied to the second switch cell and activating an enable signal supplied to the third switch cell, and when the first switch cell has been disabled based on the data of the first bit of the gamma correction data, the first switch cell deactivating the disable signal supplied to the second switch cell and deactivating the enable signal supplied to the third switch cell;

the second switch cell outputting the second selection voltage as the first reference voltage and activating an enable signal supplied to the fourth switch cell on condition that the second switch cell has been enabled based on the data of the second bit of the gamma correction data and the disable signal supplied from the first switch cell is inactive, otherwise the second switch cell deactivating the enable signal supplied to the fourth switch cell;

the third switch cell outputting the second selection voltage as the second reference voltage and activating the disable signal supplied to the fourth switch cell on condition that the third switch cell has been enabled based on the data of the second bit of the gamma correction data and the enable signal supplied from the first switch cell is active, otherwise the third switch cell deactivating the disable signal supplied to the fourth switch cell; and the fourth switch cell outputting the third selection voltage as the second reference voltage on condition that the fourth switch cell has been enabled based on the data of the third bit of the gamma correction data, the disable signal supplied from the third switch cell is inactive, and the enable signal supplied from the second switch cell is active.

4. A display driver that drives a plurality of data lines of an electro-optical device, the display driver comprising:

the reference voltage selection circuit as defined in claim 1;

a voltage selection circuit that selects a reference voltage corresponding to grayscale data from a plurality of reference voltages from the reference voltage selection circuit, and outputs the selected reference voltage as a data voltage; and a driver circuit that drives the plurality of data lines based on the data voltage.

5. An electro-optical device comprising:

a plurality of scan lines;

a plurality of data lines;

a plurality of pixel electrodes, each of the plurality of pixel electrodes being specified by a scan line among the plurality of scan lines and a data line among the plurality of data lines;

a scan driver that scans the plurality of scan lines; and the display driver as defined in claim 4 that drives the plurality of data lines.

6. An electronic instrument comprising the electro-optical device as defined in claim 5.

7. An electronic instrument comprising the display driver as defined in claim 4.

8. A reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the ground power supply voltage being supplied as the first selection voltage; and the reference voltage selection circuit further including a bypass circuit that bypasses the first switch element when a potential of the first selection voltage is lower than a ground potential.

9. The reference voltage selection circuit as defined in claim 8, the bypass circuit including:

an n-type MOS transistor, the ground power supply voltage being supplied to a gate of the n-type MOS transistor; and a p-type MOS transistor, a source and a drain of the p-type MOS transistor being respectively connected to a source and a drain of the n-type MOS transistor and the high-potential-side power supply voltage being supplied to a gate of the p-type MOS transistor; and the bypass circuit being provided in parallel with the first switch element.

10. A reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the ground power supply voltage being supplied as the first selection voltage; and the first switch element including an n-type pass transistor.

11. A reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the high-potential-side power supply voltage being supplied as the third selection voltage; and a current density of a channel region of a transistor that forms the fourth switch element being lower than a current density of a channel region of a transistor that forms a switch element among the first switch element, the second switch element, and the third switch element.

12. The reference voltage selection circuit as defined in claim 11, when a channel width of a transistor is referred to as W and a channel length of the transistor is referred to as L, a ratio W/L of the transistor that forms the fourth switch element being larger than a ratio W/L of the transistor that forms the switch element among the first switch element, the second switch element, and the third switch element.

13. A reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the high-potential-side power supply voltage being supplied as the third selection voltage; and the reference voltage selection circuit further including a bypass circuit that bypasses the fourth switch element when a potential of the third selection voltage is higher than a high-potential-side power supply potential.

14. The reference voltage selection circuit as defined in claim 13, the bypass circuit including:

a p-type MOS transistor, the high-potential-side power supply voltage being supplied to a gate of the p-type MOS transistor; and an n-type MOS transistor, a source and a drain of the p-type MOS transistor being respectively connected to a source and a drain of the n-type MOS transistor and the ground power supply voltage being supplied to a gate of the p-type MOS transistor; and the bypass circuit being provided in parallel with the fourth switch element.

15. A reference voltage selection circuit that selects a plurality of reference voltages between a high-potential-side power supply voltage and a ground power supply voltage, the reference voltage selection circuit comprising:

a first switch element that outputs a first selection voltage among the first selection voltage, a second selection voltage, and a third selection voltage arranged in potential descending order or potential ascending order as a first reference voltage among the first reference voltage and a second reference voltage arranged in potential descending order or potential ascending order;

a second switch element that outputs the second selection voltage as the first reference voltage;

a third switch element that outputs the second selection voltage as the second reference voltage; and a fourth switch element that outputs the third selection voltage as the second reference voltage, the first switch element outputting the first selection voltage as the first reference voltage on condition that the first switch element has been enabled based on data of a first bit of gamma correction data that contains at least three bits;

the second switch element outputting the second selection voltage as the first reference voltage on condition that the second switch element has been enabled based on the data of the first bit of the gamma correction data and enabled based on data of a second bit of the gamma correction data;

the third switch element outputting the second selection voltage as the second reference voltage on condition that the third switch element has been enabled based on the data of the first bit of the gamma correction data and enabled based on the data of the second bit of the gamma correction data;

the fourth switch element outputting the third selection voltage as the second reference voltage on condition that the fourth switch element has been enabled based on the data of the first bit of the gamma correction data, disabled based on the data of the second bit of the gamma correction data, and enabled based on data of a third bit of the gamma correction data;

the high-potential-side power supply voltage being supplied as the third selection voltage; and the fourth switch element including a p-type pass transistor.

* * * * *